Figure 5:
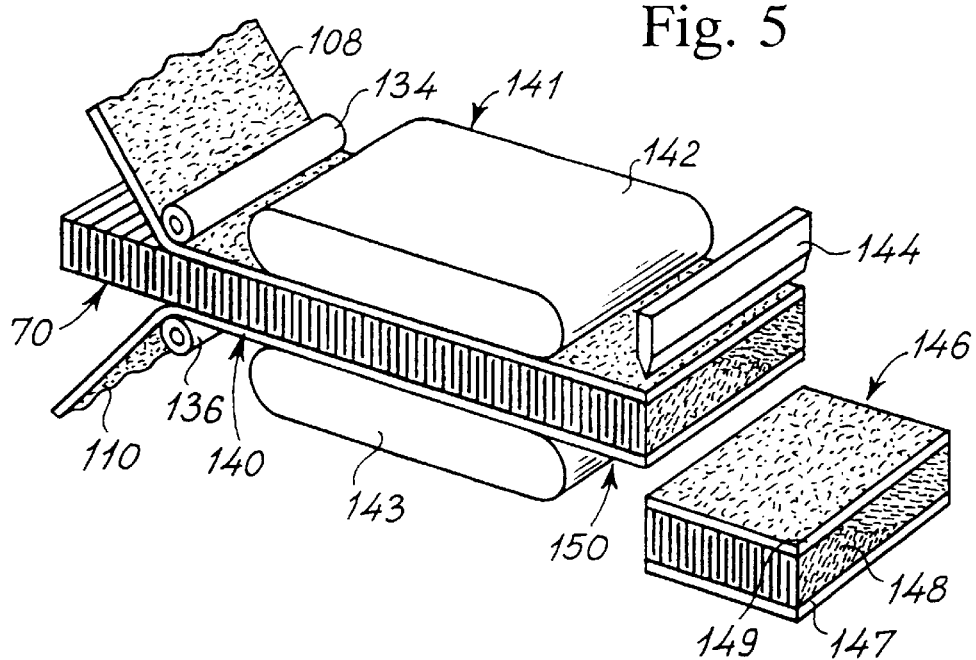

United States Patent [19]
Noergaard et al.

[11] Patent Number: 5,981,024
[45] Date of Patent: Nov. 9, 1999

[54] INSULATING ELEMENT AND METHOD AND PLANT FOR PRODUCING AND PACKAGING

[75] Inventors: Luis Joergen Noergaard, Roskilde; Kim Brandt, Karlslunde; Ian Cridland, Vanloese, all of Denmark

[73] Assignee: Rockwool International A/S, Hedenhusene, Denmark

[21] Appl. No.: 08/687,531

[22] PCT Filed: Jan. 27, 1995

[86] PCT No.: PCT/DK95/00041

§ 371 Date: Sep. 6, 1996

§ 102(e) Date: Sep. 6, 1996

[87] PCT Pub. No.: WO95/20708

PCT Pub. Date: Aug. 3, 1995

[30] Foreign Application Priority Data

Jan. 28, 1994 [DK] Denmark ................................. 128/94

[51] Int. Cl.$^6$ ....................................................... B32B 5/12
[52] U.S. Cl. .......................... 428/107; 428/113; 428/119; 428/120; 428/181; 428/182; 264/103; 264/146; 264/152; 264/160; 264/257; 425/296; 425/297; 425/301; 425/303; 425/308
[58] Field of Search ...................... 428/107, 113, 428/119, 120, 181, 182; 264/103, 146, 152, 160, 257; 425/296, 297, 301, 303, 308

[56] References Cited

U.S. PATENT DOCUMENTS 4,128,678  12/1978  Metcalfe et al. .
4,552,793  11/1985  Cameron et al. .

FOREIGN PATENT DOCUMENTS

| 128526 | 5/1974 | Denmark . |
| 277500 | 8/1988 | European Pat. Off. . |
| 1276096 | 9/1961 | France . |
| 1309929 | 10/1976 | France . |
| 2501045 | 7/1976 | Germany . |
| 3501897 | 7/1986 | Germany . |
| WO 88/00265 | 1/1988 | WIPO . |
| WO 92/10602 | 6/1992 | WIPO . |

Primary Examiner—Christopher Raimund
Attorney, Agent, or Firm—Merchant & Gould P.C.

[57] ABSTRACT

A mineral fiber plate product is produced by producing a first non-woven mineral fiber web containing mineral fibers predominantly arranged in a first longitudinal direction and segments of the first mineral fiber web are arranged in a partly mutually overlapping relationship for producing a second non-woven mineral fiber web, which contains mineral fibers generally transversally relative to one another. The second mineral fiber web is folded transversely for producing a third non-woven mineral fiber web. The third non-woven mineral fiber web is cured for producing a cured non-woven mineral fiber web from which a mineral fiber plate, or alternatively, a tubular insulating element is cut. In packaging, the volume of the mineral fiber plate may be reduced to 40%–60%.

97 Claims, 12 Drawing Sheets

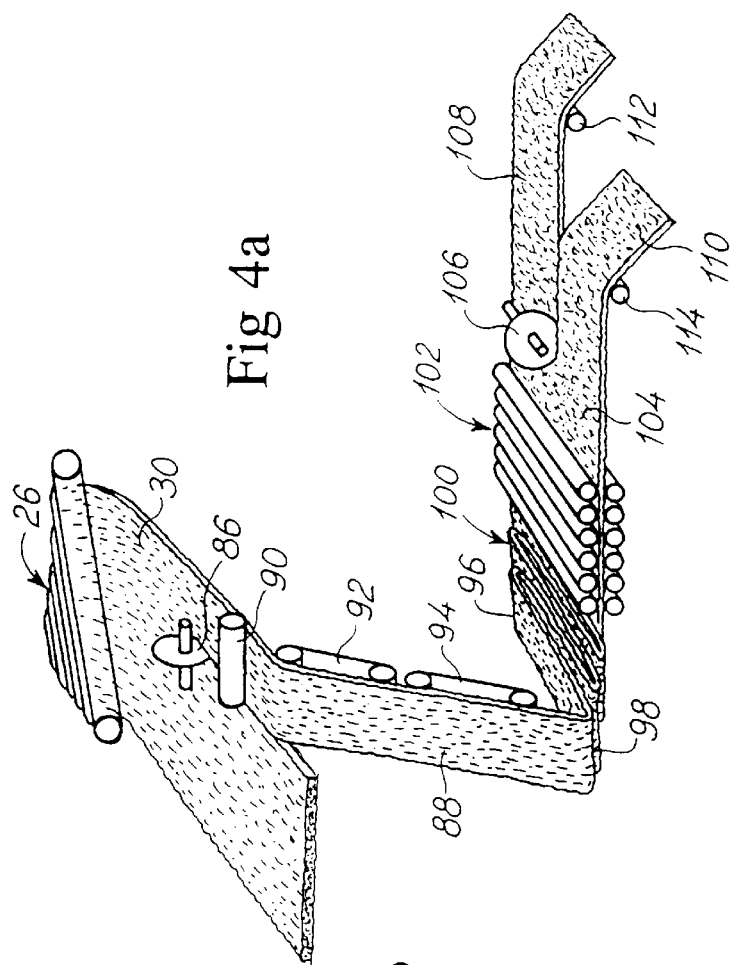
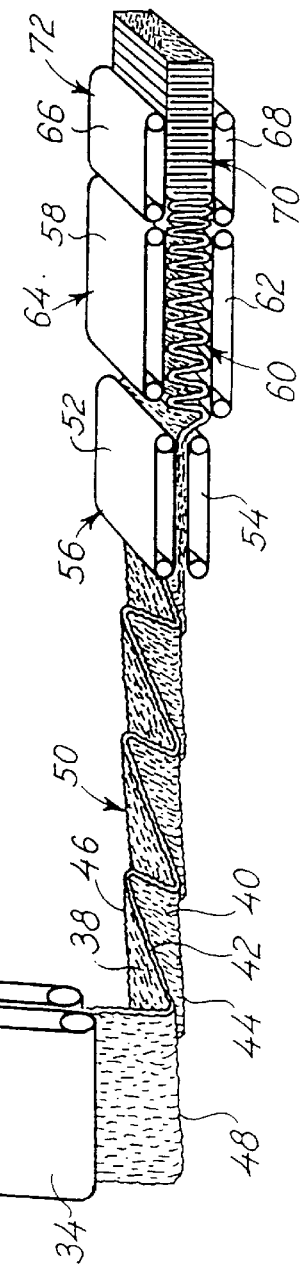
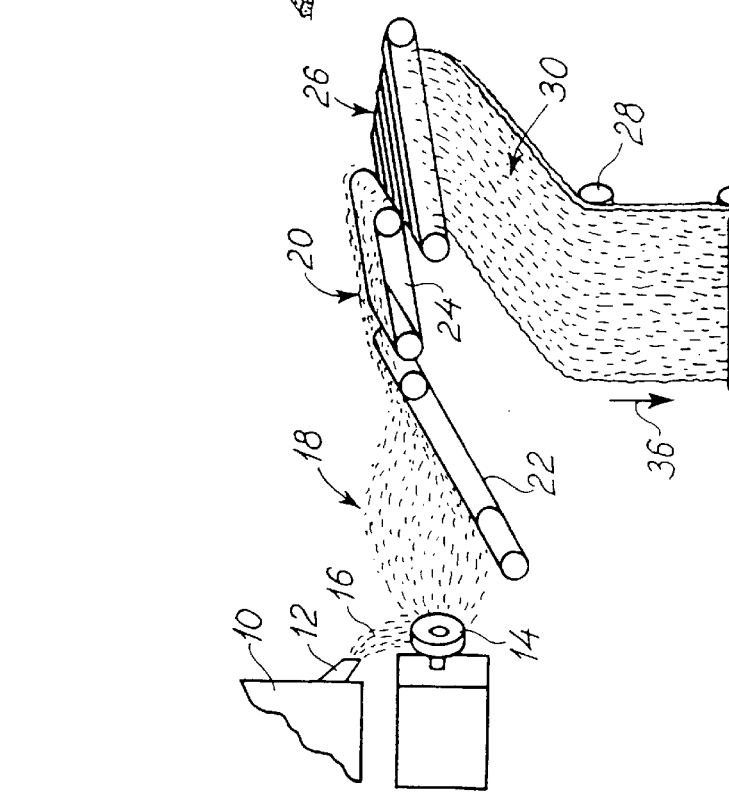
Fig 4a
Fig. 1

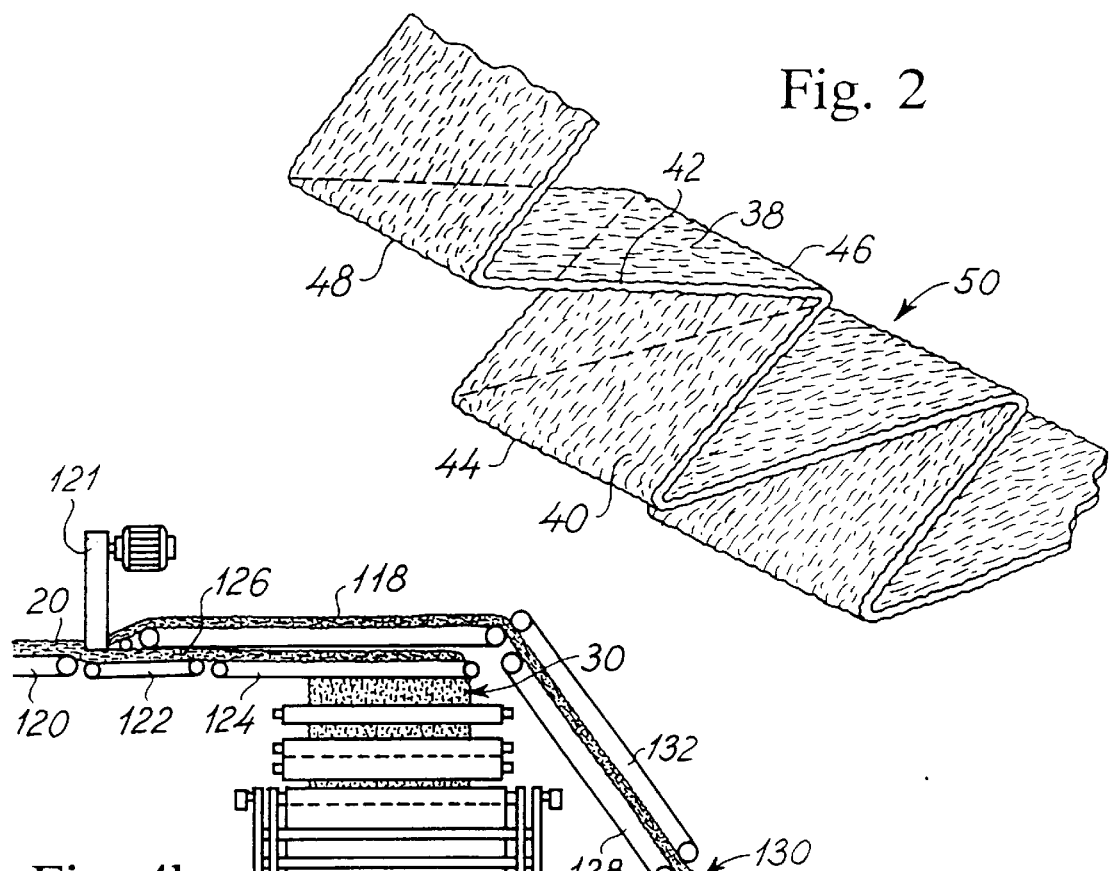
Fig. 2
Fig. 4b
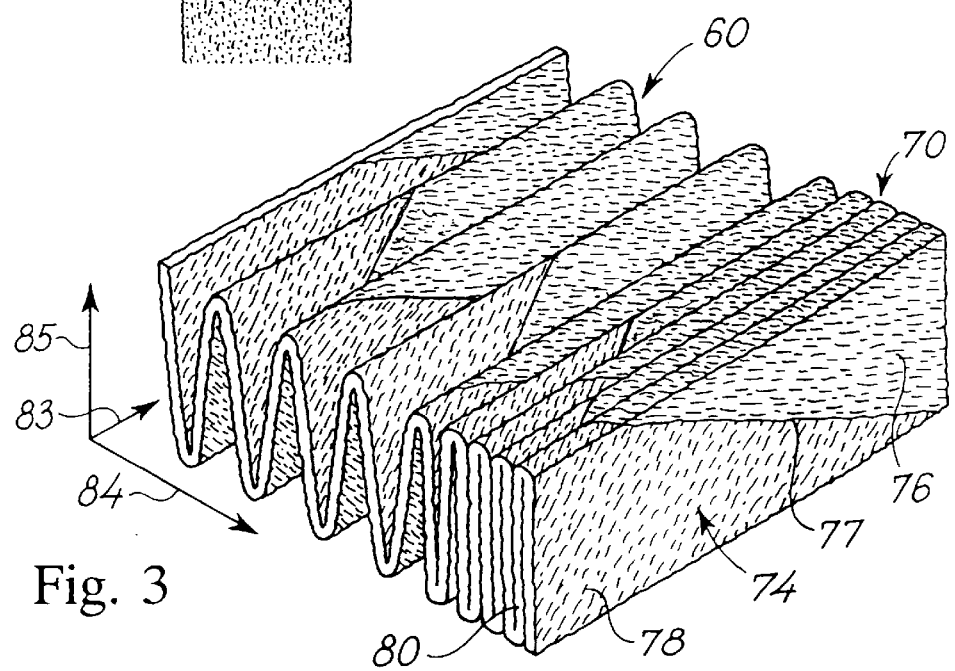
Fig. 3

INSULATING ELEMENT AND METHOD AND PLANT FOR PRODUCING AND PACKAGING

The present invention generally relates to the technical field of producing mineral fiber plates. Mineral fibers generally comprise fibers such as rockwool fibers, glass fibers, etc. More precisely, the present invention relates to a novel technique of producing a mineral fiber-insulating web from which e.g. mineral fiber-insulating plates or products are cut. The mineral fiber plates or products produced from the non-woven mineral fiber web produced in accordance with the present invention exhibit advantageous characteristics as to mechanical performance, such as modulus of elasticity and strength, low weight, reduced content of bonding agents, and good thermal-insulating property.

Non-woven mineral fiber webs are normally hitherto produced as homogeneous webs, i.e. webs in which the mineral fibers of which the mineral fiber web is composed, are generally orientated in a single predominant orientation which is determined by the orientation of the production line on which the mineral fiber web is produced and transmitted during the process of producing the mineral fiber web. The product made from a homogeneous mineral fiber web exhibits characteristics which are determined by the integrity of the mineral fiber web and which are to a high degree determined by the binding of the mineral fibers within the mineral fiber plate produced from the mineral fiber web, and further to a high degree determined by the density of the mineral fibers of the mineral fiber plate.

The advantageous characteristics of mineral fiber plates of a different structure has to some extent already been realized as techniques for the production of mineral fiber plates in which the mineral fibers are orientated in an overall orientation different from the orientation determined by the production line, has been devised, vide Published International Patent Application, International Application No. PCT/DK91/00383, International Publication No. WO 92/10602 and U.S. Pat. No. 4,950,355. Reference is made to the above patent application and patent, and the above U.S. patent is hereby incorporated in the present specification by reference.

An object of the present invention is to provide a novel method of producing a mineral fiber web from which mineral fiber plates may be cut which method renders it possible in an online production plant to produce mineral fiber plates which are of a composite structure providing distinct advantages as compared to the prior art mineral fiber-containing plates.

A further object of the present invention is to provide a novel method of producing a tubular insulating element which method renders it possible to produce tubular insulating elements exhibiting specific characteristics in terms of mechanical characteristics, including flexibility and mechanical strength, and thermal insulating properties.

A particular advantage of the present invention relates to the novel mineral fiber plate according to the present invention and produced in accordance with the method according to the present invention which as compared to prior art mineral fiber plates contains less mineral fibers and is consequently less costly than the prior art mineral fiber plates, still exhibiting advantages as compared to the prior art mineral fiber plates relating to mechanical strength and thermal-insulating properties.

A particular feature of the present invention relates to the fact that the novel mineral fiber plate according to the present invention and produced in accordance with the method according to the present invention is produceable from less mineral fibers or less material as compared to the prior art mineral fiber plate still providing the same properties as the prior art mineral fiber plate regarding mechanical strength and thermal-insulating properties, thus, providing a more lightweight and less voluminous mineral fiber plate product as compared to the prior art mineral fiber plate product reducing transport, storage and handling costs.

A further advantage of the present invention relates to the fact that the novel mineral fiber plate according to the present invention and produced in accordance with the method according to the present invention is a mineral fiber plate product exhibiting on the one hand characteristics as to mechanical strength substantially equal to the best prior art high strength non-woven mineral fiber plate products of the same or substantially the same overall dimensions and on the other hand characteristics as to thermal insulating properties equal to the best prior art high-insulating mineral fiber plate products of the same or substantially the same overall dimensions.

A further advantage of the present invention relates to the fact that the novel tubular insulating element according to the present invention and produced in accordance with the method according to the present invention may constitute a tubular insulating element which is easily adapted to specific geometric application requirements as the tubular insulating element is easily compressable and deformable due to a high flexibility of the tubular insulating element along the longitudinal direction thereof or any arbitrary direction relative to the longitudinal direction of the tubular insulating element, however, still exhibiting excellent characteristics as to mechanical strength and insulating properties.

A further feature of the present invention relates to the fact that the novel mineral fiber plate according to the present invention and produced in accordance with the method according to the present invention may constitute an insulating plate which is easily adapted to specific geometric application requirements as the insulating plate is easily compressible and deformable, however, still exhibiting excellent characteristics as to mechanical strength and insulating properties.

A further feature of the present invention relates to the novel mineral fiber plate according to the present invention which exhibits high compressibility and high compactability and further exhibits the capability of substantially recovering perfectly after the mineral fiber plate has been compacted for an elongated period of time.

A further feature of the present invention relates to the novel mineral fiber plate according to the present invention which exhibits excellent characteristics as to mechanical strength, allowing the mineral fiber plate to be confined within a packaging foil without causing any part of the mineral fiber plate, such as the outer edges or corners of the mineral fiber plate, to be permanently deformed or damaged through the mechanical impact produced by the packaging foil.

The above objects, the above advantages and the above features together with numerous other objects, advantages and features which will be evident from the below detailed description of present preferred embodiments of the invention are obtained by a method according to the present invention comprising the following steps:

a) producing a first non-woven mineral fiber web defining a first longitudinal direction parallel with the first mineral fiber web and a first transversal direction parallel with the first mineral fiber web, the first mineral fiber web containing mineral fibers predominantly arranged generally in the first longitudinal direction thereof and including a first curable bonding agent, b) moving the first mineral fiber web in the first longitudinal direction, c) arranging segments of the first mineral fiber web in partly mutually overlapping relationship and transversely relative to the first longitudinal direction and the first transversal direction so as to produce a second non-woven mineral fiber web, the second mineral fiber web defining a second longitudinal direction and a second transversal direction and containing mineral fibers predominantly arranged generally transversely relative to the second longitudinal direction and the second transversal direction and generally transversely relative to one another, d) moving the second mineral fiber web in the second longitudinal direction, e) folding the second mineral fiber web transversely relative to the second longitudinal direction and parallel with the second transversal direction so as to produce a third non-woven mineral fiber web, the third mineral fiber web containing mineral fibers predominantly arranged generally transversely relative to one another and generally transversely relative to the second longitudinal direction and the second transversal direction, f) moving the third non-woven mineral fiber web in the second longitudinal direction, and g) curing the first curable bonding agent so as to cause the mineral fibers of the third mineral fiber web to bond to one another, thereby forming the cured non-woven mineral fiber web.

In the present context, a direction defined as a direction being transversely relative to a specific reference direction defines an angular relationship between the direction in question and the reference direction. More specifically, in the present context, a transverse relationship between any two directions means that an angle is defined between the directions in question, the angle being larger than 0° and smaller than 90°. Thus, in the present context, a transverse direction means a direction different from a longitudinal or transversal direction, i.e. an intermediate direction relative to the longitudinal or transversal direction constituting the reference direction in question.

In accordance with the method according to the present invention, the mineral fibers of the third mineral fiber web which is cured for the formation of the cured non-woven mineral fiber web are arranged or positioned predominantly providing internal crossings of mineral fibers within the third mineral fiber web which crossings on the one hand provide final mineral fiber products exhibiting mechanical characteristics in terms of modulus of elasticity and strength equal to the mechanical characteristics of conventional high strength mineral fiber products such as the products known from the above-mentioned published international patent application and which crossings on the other hand provide final mineral fiber products exhibiting characteristics in terms of insulating properties equal to the insulating properties of conventional high insulating mineral fiber products.

The step of producing the second non-woven mineral fiber web from the first non-woven mineral fiber web, i.e. the above-described step c) may be carried out in any appropriate way fulfilling the intentional purpose of transforming the first mineral fiber web containing mineral fibers predominantly arranged or orientated along the first longitudinal direction defined by the first mineral fiber web and constituting the overall direction of transportation or motion of the first mineral fiber web into the second mineral finer web containing mineral fibers predominantly arranged or orientated transversely relative to one another and transversely relative to the second longitudinal direction defined by the second mineral fiber web and constituting the overall direction of transportation or motion of the second mineral fiber web.

According to a first embodiment of the method according to the present invention, the arranging of the segments of the first mineral fiber web in partly mutually overlapping relationship of step c) comprises the initial step of cutting the first mineral fiber web into the segments.

According to a second and presently preferred embodiment of the method according to the present invention, the arranging of the segments of the first mineral fiber web in partly mutually overlapping relationship of step c) comprises folding the segments of the first mineral fiber web transversely relative to the first longitudinal direction and the first transversal direction.

The angular position of the segments relative to the second longitudinal direction and relative to the speed of transportation or motion of the second mineral fiber web determines the arranging of the segments of the first mineral fiber web in partly mutually overlapping relationship in the step of producing the second mineral fiber web. For providing a second mineral fiber web containing mineral fibers producing an adequate internal crossing of the mineral fibers of the second mineral fiber web, the arranging of the segments of the first mineral fiber web in partly mutually overlapping relationship of step c) being performed so as to position the segments of the first mineral fiber web along a direction defining an angle larger than 0° and smaller than 90° relative to the second transversal direction, such as an angle of the order of 10–60°, preferably of the order of 20–50°.

The second mineral fiber web may be folded in any appropriate angle relative to the second longitudinal direction for providing a specific angular relation between the segments of the second mineral fiber web and the second longitudinal direction and consequently between the mineral fibers of the third mineral fiber web and the longitudinal direction thereof. However, the folding of the second mineral fiber web of step e) is performed preferably as a transverse folding relative to the second longitudinal direction so as to produce the third mineral fiber web including the segments originating from the first mineral fiber web arranged or positioned substantially perpendicular relative to the longitudinal direction of the third mineral fiber web, i.e. the second longitudinal direction.

The product or products produced in accordance with the method according to the present invention are preferably products including a fairly small amount of mineral fibers as compared to conventional products exhibiting similar characteristics as the product according to the present invention in terms of mechanical strength and insulating properties. Thus, the first mineral fiber web is preferably a mineral fiber web of a low area weight, such as an area weight of 0.1–1.0 kg/m$^2$, preferably 0.2–0.6 kg/m$^2$. Similarly, the second mineral fiber web is preferably a mineral fiber web of an area weight of the order of 0.3–3.0 kg/m$^2$, preferably 0.5–2.0 kg/m$^2$.

In accordance with the technique described in the above-mentioned published international patent application, application No. PCT/DK91/00383, publication No. WO 92/10602, the second and third mineral fiber webs are preferably exposed to compacting and compression in order to provide more compact and more homogeneous mineral fiber webs. The compacting and compression may include height compression, longitudinal compression, transversal compression and combinations thereof. Thus, the method according to the present invention preferably further comprises the additional step of height compressing the second mineral fiber web produced in step c) by arranging the segments of the first mineral fiber web in partly mutually overlapping relationship and transversely relative to the first longitudinal direction of the first mineral fiber web.

Further preferably, the method according to the present invention comprises the additional step of longitudinally compressing the second mineral fiber web produced in step c) and additionally or alternatively the additional step of transversally compressing the second mineral fiber web produced in step c).

The compacting and compression may further or alternatively comprise the additional step of height compressing the third mineral fiber web produced in step e).

Furthermore, the method according to the present invention may comprise the additional step of longitudinally compressing the third mineral fiber web produced in step e) and additionally or alternatively the additional step of transversally compressing the third mineral fiber web produced in step e).

By performing one or more of the above-described compression steps, the mineral fiber web exposed to the compression step or steps is made more homogeneous, resulting in an overall improvement of the mechanical performance as compared to a non-compressed mineral fiber web.

According to the presently preferred embodiment of the method according to the present invention, the folding of the second mineral fiber web of step e) advantageously comprises the step of producing undulations extending perpendicular to the second longitudinal direction and parallel with the second transversal direction. As the second mineral fiber web is folded in accordance with the teachings of the present invention, the segments of the second mineral fiber web are arranged generally perpendicular to the second longitudinal direction and generally parallel with the second transversal direction. Consequently, the mineral fibers of the second mineral fiber web are predominantly arranged in a pattern of crossings providing on the one hand a final mineral fiber plate of high mechanical strength and on the other hand a final mineral fiber plate of high insulating capability.

According to a further, additional or alternative embodiment of the method according to the present invention, the method further comprises the following steps substituting step g):

h) producing a fourth non-woven mineral fiber web defining a third longitudinal direction parallel with the fourth mineral fiber web, the fourth mineral fiber web containing mineral fibers and including a second curable bonding agent, the fourth mineral fiber web being a mineral fiber web of a higher compactness as compared to the third mineral fiber web, i) adjoining the fourth mineral fiber web to the third mineral fiber web in facial contact therewith for producing a fifth composite mineral fiber web, and j) curing the first and second curable bonding agents so as to cause the mineral fibers of the fifth composite mineral fiber web to bond to one another, thereby forming the cured non-woven mineral fiber web.

The fourth non-woven mineral fiber web which is adjoined to the third mineral fiber web in step c) may constitute a separate mineral fiber web. Thus, the third and the fourth mineral fiber webs may be produced by separate production lines which are joined together in step i).

In accordance with a first embodiment of the method according to the present invention, the fourth mineral fiber web is produced by separating a separate layer of the first mineral fiber web therefrom and by compacting the separate layer for producing the fourth mineral fiber web.

In accordance with a second embodiment of the method according to the present invention, the fourth mineral fiber web is produced by separating a separate layer of the second mineral fiber web therefrom and by compacting the separate layer for producing the fourth mineral fiber web.

In accordance with a third embodiment of the method according to the present invention the fourth mineral fiber web is produced by separating a separate layer of the third mineral fiber web therefrom and by compacting the separate layer for producing the fourth mineral fiber web.

The separate layer from which the fourth non-woven mineral fiber web is produced may irrespective of the origin of the separate layer be separated from the mineral fiber web being the first, the second or the third mineral fiber web from which the separate layer is separated as a surface layer or a side segment layer. Furthermore, provided the separate layer constitute a surface layer, the surface layer may be produced as a top or a bottom surface layer separated from the mineral fiber web from which the separate layer is separated.

The fourth mineral fiber web may additionally be produced by compacting he separate layer comprising the step of folding the separate layer so as to produce the fourth mineral fiber web containing mineral fibers predominantly arranged generally transversely relative to the third longitudinal direction of the fourth mineral fiber web.

The method according to the present invention preferably further comprises the additional step similar to the step h) of producing a sixth non-woven mineral fiber web similar to the fourth mineral fiber web, and the step of adjoining in step i) the sixth mineral fiber web to the third mineral fiber web in facial contact therewith and so as to sandwich the third mineral fiber web between the fourth and sixth mineral fiber web in the fifth composite mineral fiber web. By producing a sixth non-woven mineral fiber web an integral composite mineral fiber structure of the fourth mineral fiber web is accomplished in which structure, the central body originating from the second mineral fiber web is sandwiched between opposite compacted surface layers constituted by the fourth and the sixth mineral fiber webs.

The third longitudinal direction defined by the fourth non-woven mineral fiber web may in accordance with alternative embodiments be perpendicular to the second longitudinal direction or identical to the second longitudinal direction. Furthermore, the third longitudinal direction defined by the fourth non-woven mineral fiber web may constitute a direction diverging from the above directions and constitute a direction which is transverse relative to the second longitudinal direction.

The method according to the present invention may further preferably comprise the additional step of compressing the fifth composite mineral fiber web prior to curing the fifth composite mineral fiber web in step j). The compression of the fifth composite mineral fiber web may comprise height compression, longitudinal compression and/or transversal compression. By compressing the fifth composite mineral fiber web, the homogeneity of the final product is believed to be improved as the compressing of the fifth composite mineral fiber web produces a homogenizing effect on the third non-woven mineral fiber web constituting a central body of the fifth composite mineral fiber web.

According to a particular, relevant embodiment of the method according to the present invention, the method further comprises the following steps prior to step e):

k) producing a seventh non-woven mineral fiber web defining a fourth longitudinal direction parallel with the seventh mineral fiber web, the seventh mineral fiber web containing mineral fibers and including a third curable bonding agent, the seventh mineral fiber web being a mineral fiber web of a higher compactness as compared to the second mineral fiber web, and l) adjoining the seventh mineral fiber web to the second mineral fiber web produced in step c) in facial contact therewith, prior to step e), for producing an eighth composite mineral fiber web to be folded in step e) for producing the third non-woven mineral fiber web, and step g) also including curing the third curable bonding agent.

According to the above-defined embodiment of the method according to the present invention, an integral composite product is produced as the seventh mineral fiber web is adjoined to the second mineral fiber web prior to the processing of the eighth composite mineral fiber web in step e) for producing the third non-woven mineral fiber web containing mineral fibers predominantly arranged or orientated in the crossing structure characteristic of the present invention.

The seventh non-woven mineral fiber web, which is adjoined to the second mineral fiber web in step 1), may constitute a separate mineral fiber web. Thus the second and seventh mineral fiber webs may be produced on separate production lines which are joined together in step 1).

In accordance with a further embodiment of the method according to the present invention, the seventh non-woven mineral fiber web is produced by separating a separate layer of the first mineral fiber web therefrom and by compacting the separate layer for producing the seventh mineral fiber web.

In accordance with an alternative embodiment of the method according to the present invention, the seventh mineral fiber web is produced by separating a separate layer of the second mineral fiber web therefrom and by compacting the separate layer for producing the seventh mineral fiber web.

Like the above-described fourth non-woven mineral fiber web, the seventh non-woven mineral fiber web may, provided the seventh non-woven mineral fiber web is produced by separating a separate layer from the first or second mineral fiber web, be produced as a surface layer or a side segment layer. Furthermore the surface layer may, provided the separate layer from which the seventh mineral fiber web is produced is provided as a surface layer of the first or second mineral fiber web, be produced as a top or bottom surface layer separated from the mineral fiber web from which the separate layer is separated.

The compacting of the separate layer from which the seventh mineral fiber web is produced may, according to a further embodiment of the method according to the present invention, comprise the step of folding the separate layers so as to produce the seventh mineral fiber web containing mineral fibers predominantly arranged generally transversely relative to the fourth longitudinal direction of the seventh mineral fiber web.

The method according to the present invention may further preferably and advantageously comprise the step of applying a covering to a side surface or both side surfaces of the third mineral fiber web and/or applying a covering to a side surface or both side surfaces of the fifth composite mineral fiber web. Furthermore, a covering may be applied to the seventh non-woven mineral fiber web prior to the step 1) of adjoining the seventh mineral fiber web to the second mineral fiber web, providing a composite eighth mineral fiber web including a covering applied to a top or a bottom surface thereof or interlayered between the seventh and second mineral fiber webs of the eighth composite mineral fiber web. The covering constituting an integral component of the eighth composite mineral fiber web is, of course, also folded in step e) and produces interlayered coverings within the structure of the third non-woven mineral fiber web. The covering may be a foil of a plastics material, such as a continuous foil, a woven or non-woven mesh, or alternatively a foil of a non-plastics material, such as a paper or cloth material, a metal sheet, a metal plate, a metal foil, or a mesh of metal wire or wires. The mineral fiber-insulating web produced in accordance with the method according to the present invention may, as discussed above, be provided with two oppositely arranged mineral fiber webs sandwiching a central body of the composite mineral fiber-insulating web. Provided the mineral fiber-insulating web is produced as a three-layer assembly, one or both outer side surfaces may be provided with similar or identical surface coverings.

The step g) of curing the first curable bonding agent and optionally the second and third curable bonding agents as well may, dependent on the nature of the curable bonding agent or agents, be carried out in numerous different ways, e.g. by simply exposing the curable bonding agent or agents to a curing gas or a curing atmosphere, such as the atmosphere, by exposing the curable bonding agent or agents to radiation, such as UV radiation or IR radiation. Provided the curable bonding agent or agents are a heat-curable bonding agents, such as conventional resin-based bonding agents normally used within the mineral fiber industry, the process of curing the curable bonding agent or agents includes the step of introducing the mineral fiber web to be cured into a curing oven. Consequently, the curing process is performed by means of a curing oven. Further alternative curing appliances may comprise IR radiators, microwave radiators, etc.

From the cured mineral fiber-insulating web, plate segments are preferably cut by cutting the cured non-woven third or fifth composite mineral fiber web into plate segment in a separate production step.

The above objects, the above advantages and the above features together with numerous other objects, advantages and features is furthermore obtained by means of a plant for producing a cured non-woven mineral fiber web, comprising:

a) first means for producing a first non-woven mineral fiber web defining a first longitudinal direction parallel with the first mineral fiber web and a first transversal direction parallel with the first mineral fiber web, the first mineral fiber web containing mineral fibers predominantly arranged generally in the first longitudinal direction thereof and including a first curable bonding agent, b) second means for moving the first mineral fiber web in the first longitudinal direction, c) third means for arranging segments of the first mineral fiber web in partly mutually overlapping relationship transversely relative to the first longitudinal direction and the first transversal direction so as to produce a second non-woven mineral fiber web, the second mineral fiber web defining a second longitudinal direction and a second transversal direction and containing mineral fibers predominantly arranged generally transversely relative to the second longitudinal direction and the second transversal direction and generally transversely relative to one another, d) fourth means for moving the second mineral fiber web in the second longitudinal direction, e) fifth means for folding the second mineral fiber web transversely relative to the second longitudinal direction and parallel with the second transversal direction so as to produce a third non-woven mineral fiber web, the third mineral fiber web containing mineral fibers predominantly arranged generally transversely relative to one another and generally transversely relative to the second longitudinal direction and the second transversal direction, f) sixth means for moving the third non-woven mineral fiber web in the second longitudinal direction, and g) seventh means for curing the first curable bonding agent so as to cause the mineral fibers of the third mineral fiber web to bond to one another, thereby forming the cured non-woven mineral fiber web.

The plant according to the present invention may advantageously comprise any of the above characteristics of the method according to the present invention.

The above objects, the above advantages and the above features together with numerous other objects, advantages and features is furthermore obtained by means of a mineral fiber plate according to the present invention, which mineral fiber defines a first direction and comprises:

first and second lamellae arranged transversely relative to the first direction, the first and second lamellae containing mineral fibers predominantly arranged transversely relative to the first direction and transversely relative to one another, and the fibers of the first and second lamellae being bonded together in an integral structure solely through hardened bonding agents hardened in a single hardening process and initially present in uncured, non-woven mineral fiber webs from which the first and second lamellae are produced.

The first and second lamellae of the mineral fiber plate according to the present invention may be bonded together through an adhesive which is applied to the outer surfaces of the first and second lamellae after the curing and hardening of the bonding agents bonding the mineral fibers of the first and second lamellae together and after cutting the first and second lamellae from a cured mineral fiber web produced in accordance with the teachings of the present invention. The first and second lamellae of the mineral fiber web according to the present invention may alternatively be linked together through other elements such as different mineral fiber products, foils, films or the like.

According to the presently preferred embodiment of the mineral fiber plate according to the present invention, the first and second lamellae are bonded together through hardened bonding agents hardened in a single hardening process and initially present in uncured, non-woven mineral fiber webs from which the first and second lamellae are produced.

According to the presently preferred embodiment of the mineral fiber plate according to the present invention described above, the mineral fiber plate is as a unitary structure hardened in a single hardening process through one or more bonding agents present in the mineral fiber webs from which the lamellae of the mineral fiber plate are composed and further optionally applied to surfaces of a adjacent lamellae which surfaces are adjoined one another prior to the curing or hardening process.

According to a particular, advantageous embodiment of the mineral fiber plate according to the present invention, the first and second lamellae are interconnected through mineral fiber layers of a higher mineral fiber compactness as compared to the lamellae. The mineral fiber layers of higher mineral fiber compactness may include mineral fibers arranged or orientated predominantly along any arbitrary direction independent of the crossing-structure arrangement of the mineral fibers of the first and second lamellae.

According to a further embodiment of the mineral fiber plate according to the present invention, a surface layer is applied to one side of the first and second lamellae or opposite surface layers of a similar structure, sandwiching the first and second lamellae in the integral structure.

The mineral fiber plate according to the present invention may advantageously comprise any of the above characteristics of the method according to the present invention and also any characteristics of the plant according to the present invention.

The above objects, the above advantages and the above features together with numerous other objects, advantages and features is furthermore obtained by means of a method of packaging a mineral fiber plate in a package, comprising the following steps:

providing the mineral fiber plate defining a first direction and being compactable along the first direction, providing the package, arranging the mineral fiber plate within the package, compacting the mineral fiber plate along the first direction thereof for substantially reducing the overall volume of the mineral fiber plate, e.g. to 30–95%, such as 30–85%, preferably 40–60%, of the overall volume of the non-compacted mineral fiber plates, and sealing the package for providing a sealed package within which the mineral fiber plate is kept in a compacted state in which the overall volume of the mineral fiber plate constitutes 30–100%, such as 50–90%, preferably 60–80% of the overall volume of the non-compacted mineral fiber plate.

The high compressibility and compactability of the mineral fiber plate according to the present invention and further the capability of the mineral fiber plate according to the present invention to recover to substantially 100% after the mineral fiber plate has been compacted for even an elongated period of time renders it possible to package the mineral fiber plate exhibiting compressibility and compactability along a specific direction defined as the first direction of the mineral fiber plates for reducing the overall volume of the mineral fiber plate included in the package.

The mineral fiber plate to be packed in accordance with the method of packaging a mineral fiber plate in accordance with the present invention may constitute any mineral fiber plate exhibiting the characteristic property of being compactable along the first direction of the mineral fiber plate which first direction may constitute the longitudinal direction of the mineral fiber plate or the transversal direction of the mineral fiber plate, i.e. the transversal direction defining together with the longitudinal direction the major surface of the mineral fiber plate. It is to be understood that the compressability and compactability of the mineral fiber plate is a substantially uniform characteristic allowing any volume of the mineral fiber plate along the first direction to be compacted. Examples of mineral fiber plates exhibiting the above characteristic, i.e. exhibiting compressibility and compactability along a specific direction defined as the first direction of the mineral fiber plate are mineral fiber plates produced in accordance with the method according to the present invention of producing a cured non-woven mineral fiber web, mineral fiber plates produced in accordance with the technique described in Applicant's published international patent applications, application No. PCT/DK94/00027, publication No. WO 94/16162; application No. PCT/DK94/00028, publication No. WO 94/16163; and application.No. PCT/DK94/00029, publication No. WO 94/16164, to which reference is made, mineral fiber plates produced from mineral fiber webs which have been exposed to longitudinal compression and produced from an initial uncured non-woven mineral fiber web or from an uncured non-woven mineral fiber web which is produced from the initial uncured, non-woven mineral fiber web through positioning the initial uncured non-woven mineral fiber web in overlaying relationship.

According to the presently preferred embodiment of the method of packaging a mineral fiber plate, a plurality of mineral fiber plates are packed together, and the method comprises packaging a plurality of mineral fiber plates each defining a respective first direction, and the step of arranging the mineral fiber plate within the package including arranging the plurality of mineral fiber plates within the package so as to arrange the mineral fiber plates of the plurality in mutually parallel relationship and having the respective first directions of the mineral fiber plates positioned parallel to one another.

The package within which the compacted mineral fiber plate or plates are contained may be constituted by any appropriate package such as a cardboard package, or preferably a light weight package constituted by a covering of a plastic foil which is sealable, preferably heat sealable and which is wrapped around the compacted mineral fiber plate or plates and sealed in the wrapped-around-state providing the package within which the mineral fiber plate or plates are enclosed or sealed.

The number of mineral fiber plates within the plurality of mineral fiber plates contained within the package may vary from a very few numbers such as 2–4 to a fairly large number such as 20–30 or even more mineral fiber plates. The mineral fiber plate which is sealed within the package according to the method of packaging a mineral fiber plate preferably constitutes a mineral fiber plate having any of the characteristics of the mineral fiber plate according to the present invention.

The above objects, the above advantages and the above features together with numerous other objects, advantages and features is furthermore obtained by means of a package containing a mineral fiber plate, comprising:

the mineral fiber plate defining a first direction and being compactable along the first direction, the package constituting a sealed package within which the mineral fiber plate is confined, and the mineral fiber plate being kept in a compacted state within the sealed package in which state the overall volume of the mineral fiber plate is substantially reduced, e.g. to 30–100%, such as 50–90%, preferably 60–80% of the overall volume of the non-compacted mineral fiber plate through compacting the mineral fiber plate along the first direction thereof.

The package according to the present invention is preferably produced in accordance with the method of packaging a mineral fiber plate and further preferably comprises a mineral fiber plate exhibiting any of the characteristics of the mineral fiber plate according to the present invention.

The above objects, the above advantages and the above features together with numerous other objects, advantages and features is further obtained by means of a method of producing a tubular insulating element, comprising sing the following steps:

a) providing a non-woven mineral fiber web defining a first longitudinal direction parallel with the non-woven mineral fiber web, a first transversal direction parallel with the non-woven mineral fiber web, and a second transversal direction perpendicular to the first longitudinal and transversal directions, and b) cutting the tubular insulating element from the non-woven mineral fiber web defining a second longitudinal direction, the second longitudinal direction being parallel with the first longitudinal direction, the first transversal direction, or the second transversal direction or defining a specific angular relationship with the first longitudinal direction, the first transversal direction or the second transversal direction.

According to the method of producing a tubular insulating element according to the present invention, the inherent characteristics of the basic non-woven mineral fiber web from which the tubular insulating element is produced may be transferred to the tubular insulating element. More particularly, a tubular insulating element may be produced exhibiting a specific characteristic along a specific direction of the tubular insulating element such as exhibiting compressibility and compactability along a specific direction as the tubular insulating element is produced from a non-woven mineral fiber web exhibiting the characteristic in question, e.g. the compressability and compactability along a specific direction of the non-woven mineral fiber web which specific direction is orientated along the intentional specific direction of the tubular insulating element. The specific direction of the non-woven mineral fiber web may constitute the first longitudinal direction, the first transversal direction or the second transversal direction or may diverge from any of these directions.

The non-woven mineral fiber web from which the tubular insulating element is produced may in accordance with the teachings of the present invention constitute a single non-woven mineral fiber web or alternatively a non-woven mineral fiber web assembly composed of a plurality of individual non-woven mineral fiber web segments each exhibiting specific characteristics which are transferred to the tubular insulating element.

Preferably, and advantageously, the non-woven mineral fiber web from which the tubular insulating element is produced in accordance with the method according to the present invention is produced in accordance with the method of producing a cured non-woven mineral fiber web according to the present invention. Alternatively, the non-woven mineral fiber web from which the tubular insulating element is produced may be produced from a basic, uncured non-woven mineral fiber web and being exposed to compression along the first longitudinal direction and/or along the first transversal direction and/or the second transversal direction prior to and/or after curing the uncured non-woven mineral fiber web. For producing a tubular insulating element having an outer surface coating, the method of producing the tubular insulating element according to the present invention preferably also comprises the step:

c) applying an outer surface coating to the tubular insulating element, the outer surface coating being constituted by a plastics foil, a woven or non-woven plastics fiber foil, an aluminum foil, an aluminum foil reinforced plastics foil, a fiber reinforced plastics foil, a creape paper covering, a glassfiber reinforced foil or a combination thereof.

The outer surface coating may in accordance with alternative techniques be applied as a contiguous surface coating or as a segmentary outer surface coating. Further alternatively, the outer surface coating may be fixated to, e.g. adhered to, the outer surface of the tubular insulating element in a continuous surface adhesion or as a spot or blind contact adhesion.

The above objects, the above advantages and the above features together with numerous other objects, advantages and features is further obtained by means of a tubular insulating element comprising a body containing mineral fibers bonded together in an integral structure through hardened bonding agents and being produced from a mineral fiber plate defining a first longitudinal direction parallel with the non-woven mineral fiber web, a first transverse direction parallel with the non-woven mineral fiber web, and a second transversal direction perpendicular to the first longitudinal and transversal directions by cutting the tubular insulating element from the non-woven mineral fiber web defining a second longitudinal direction, the second longitudinal direction being parallel with the first longitudinal direction, the first transversal direction, or the second transversal direction or defining a specific angular relationship with the first longitudinal direction, the first transversal direction or the second transversal direction. The tubular insulating element according to the present invention is preferably produced in accordance with the method of producing a tubular insulating element and further preferably comprises any of the characteristics of the mineral fiber plate according to the present invention and any of the above discussed characteristics obtained by the method of producing a tubular insulating element in accordance with the teachings of the present invention.

Figure 6:
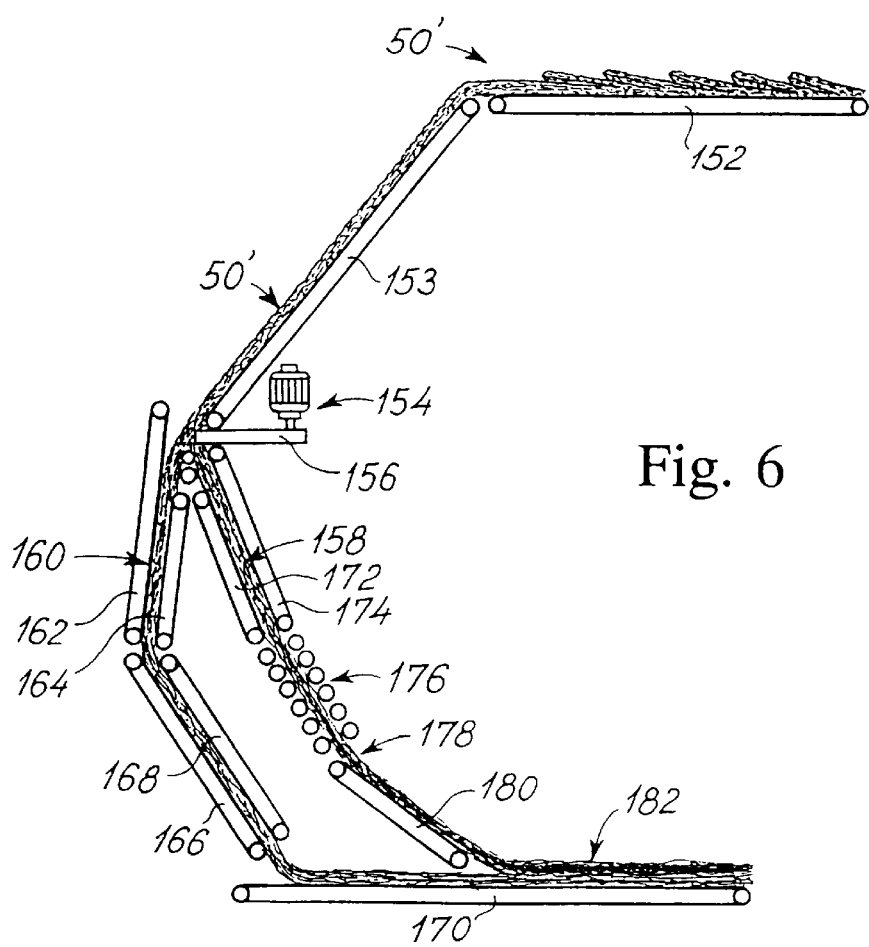
Figure 7:
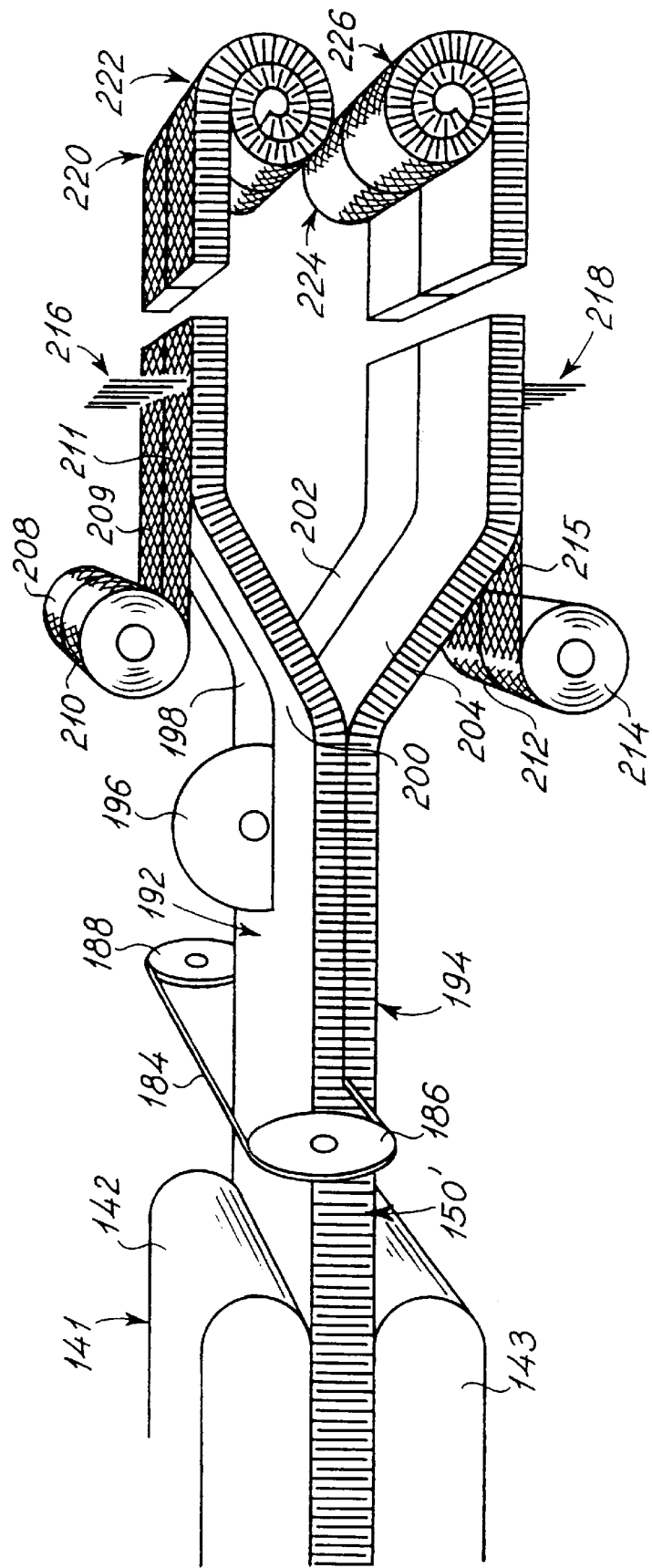
Figure 8:
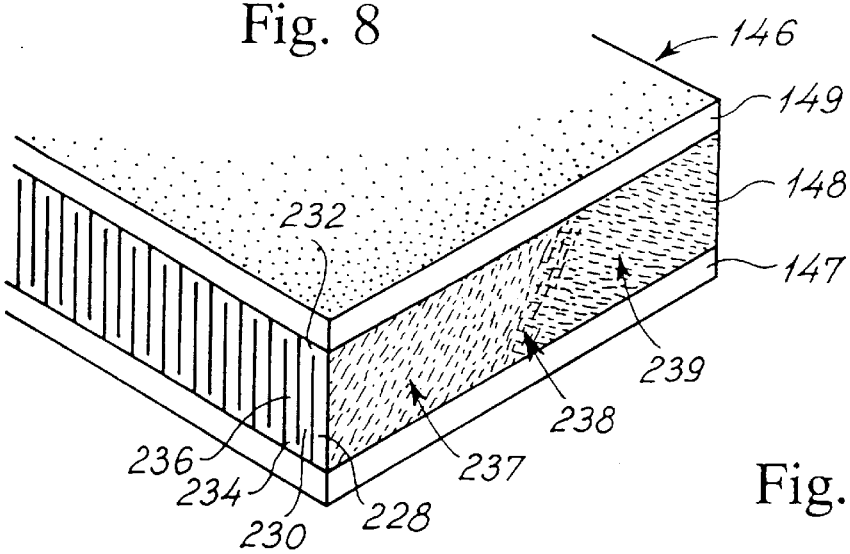
Figure 9:
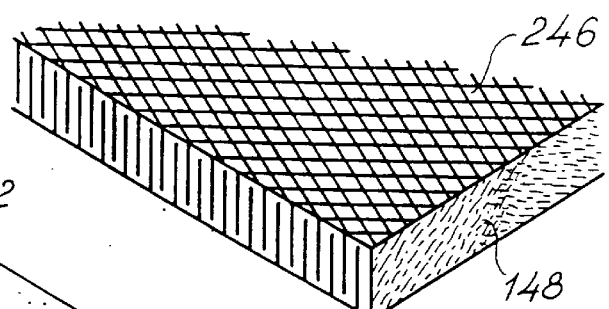
Figure 10:
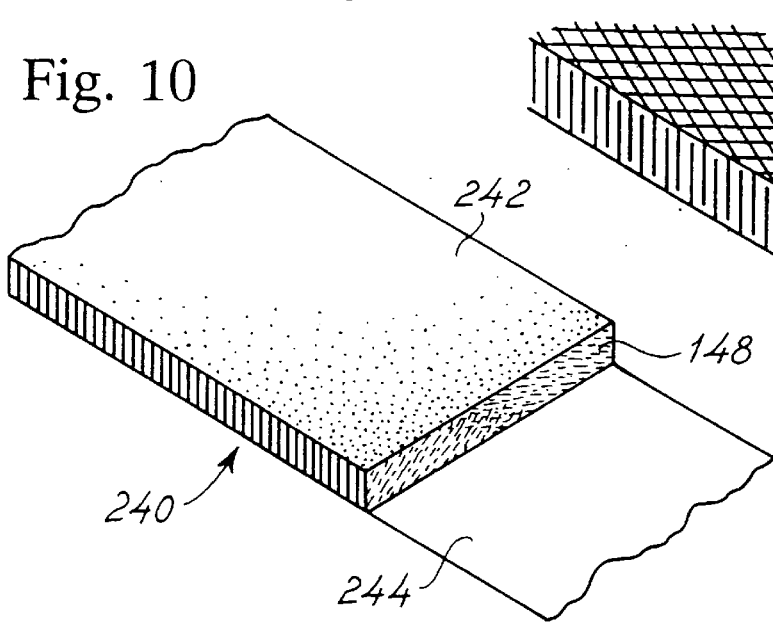
Figure 11:
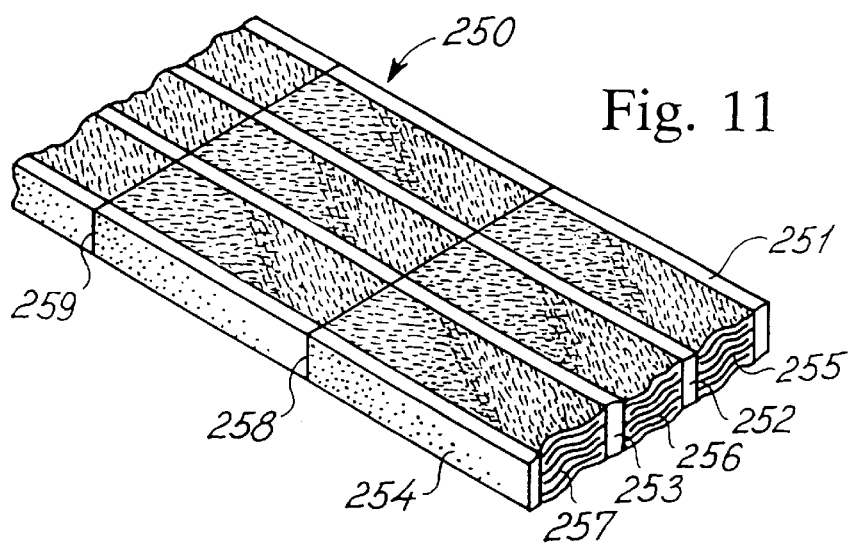
Figure 12:
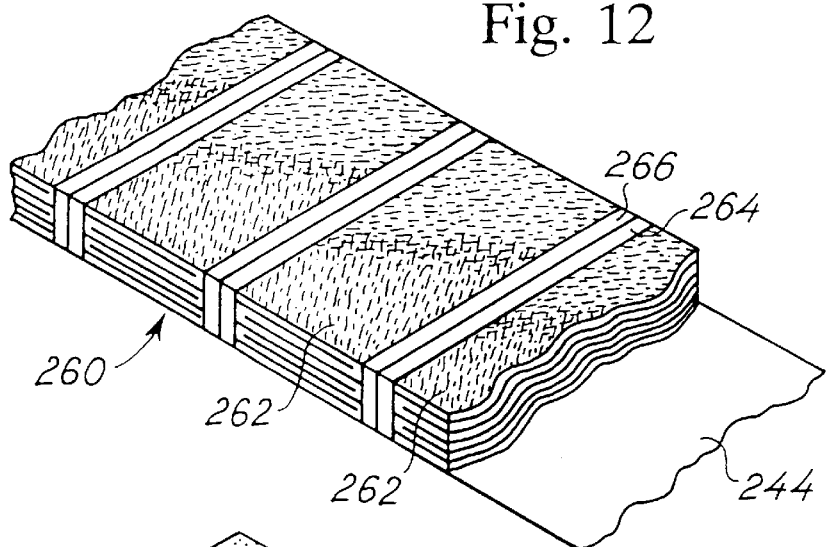
Figure 13:
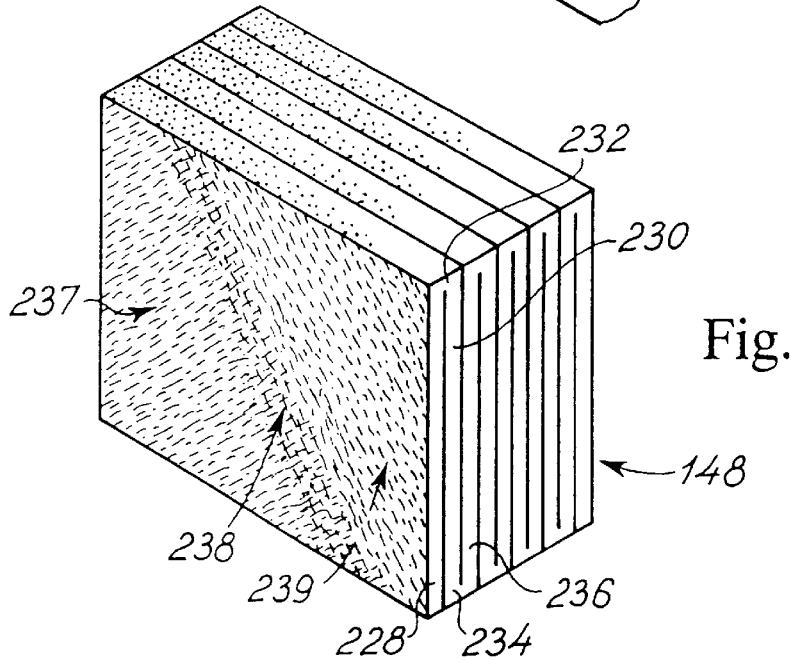
Figure 14:
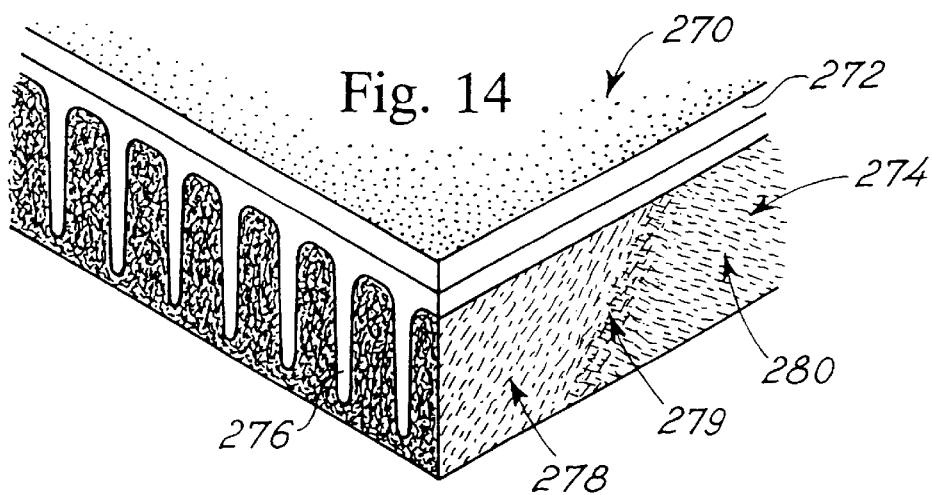
Figure 15:
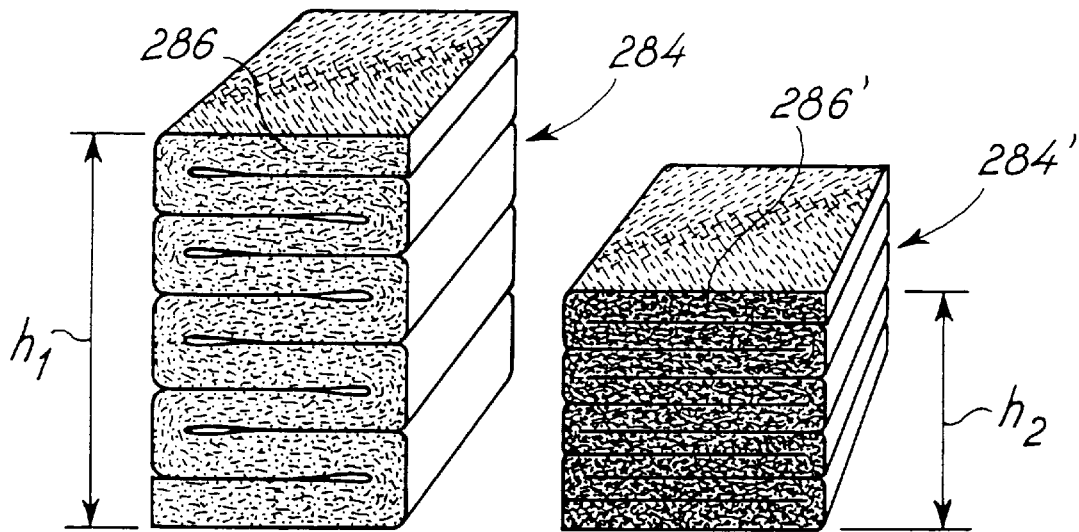
Figure 16:
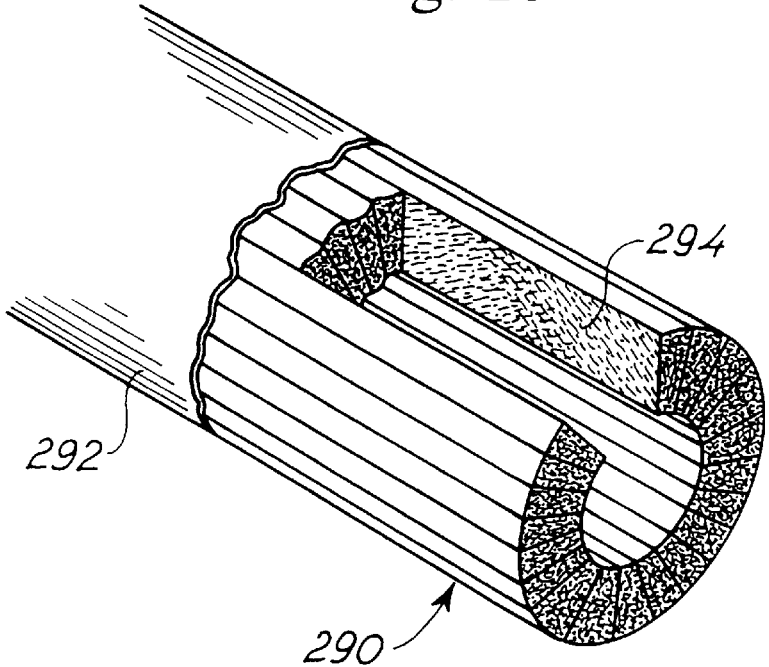
Figure 17A:
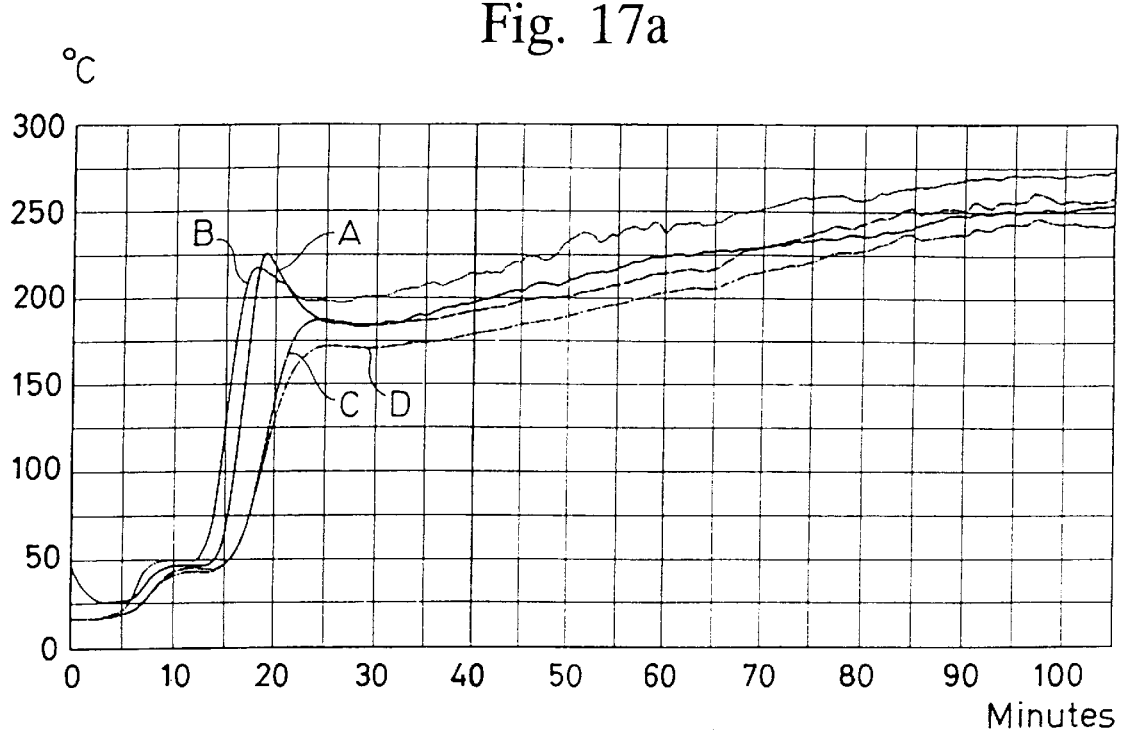
Figure 17B:
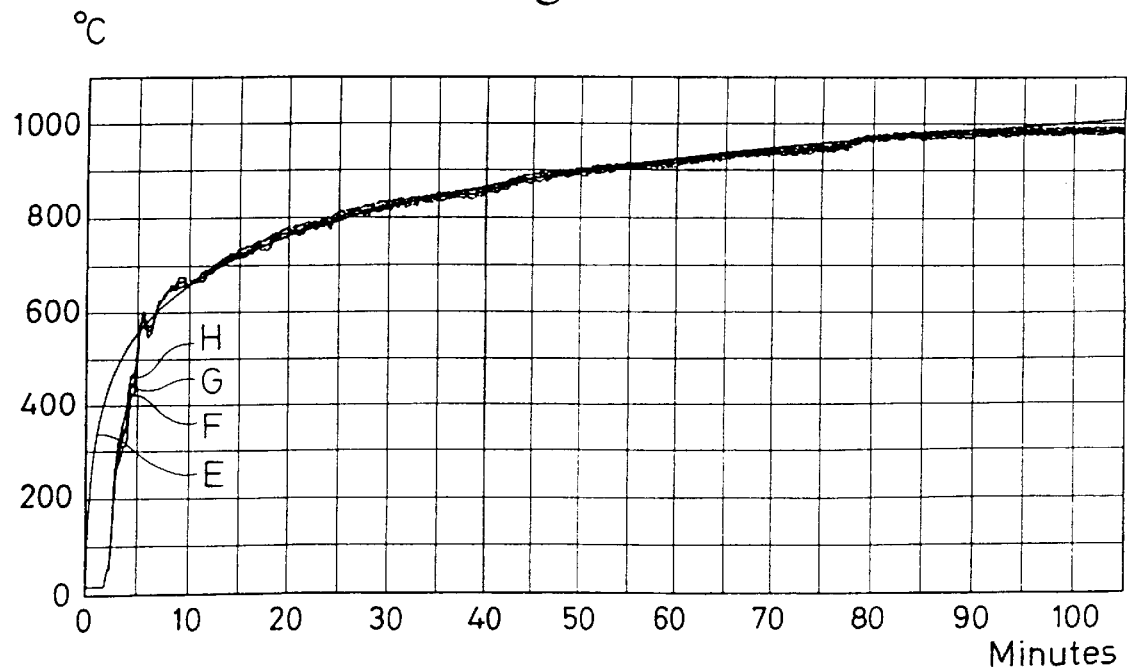
Figure 18A:
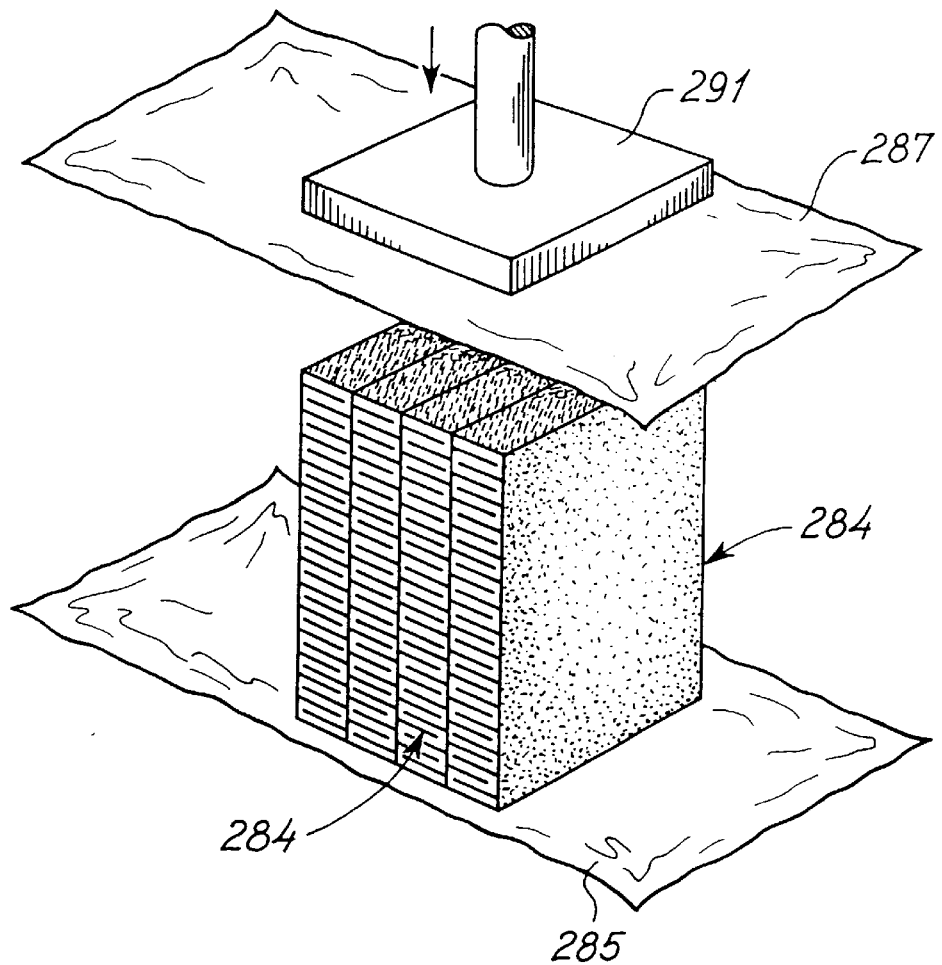
Figure 18B:
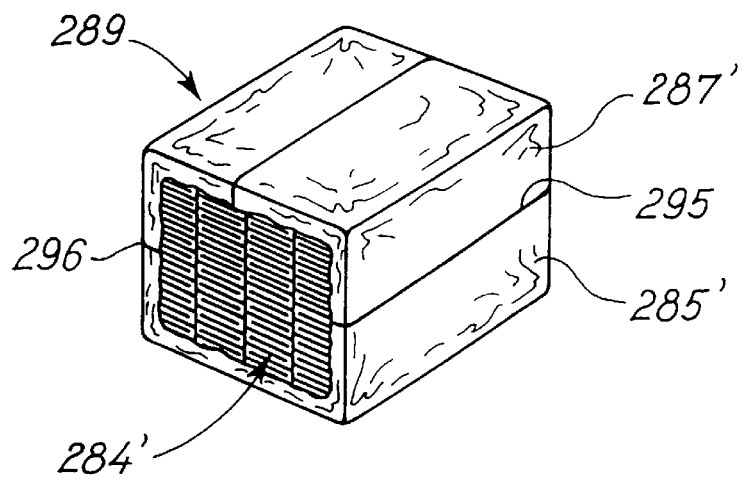
Figure 19:
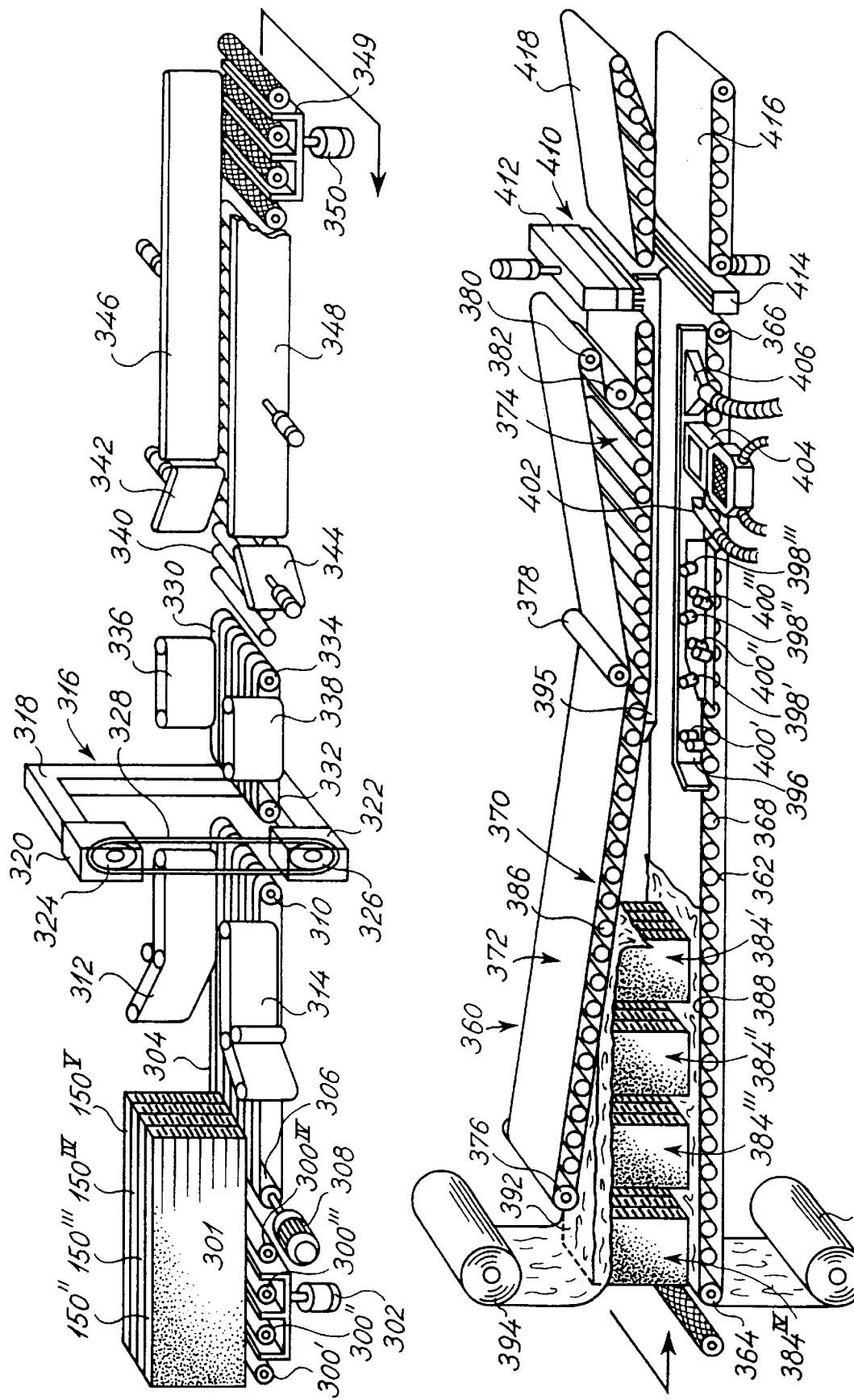
Figure 20:
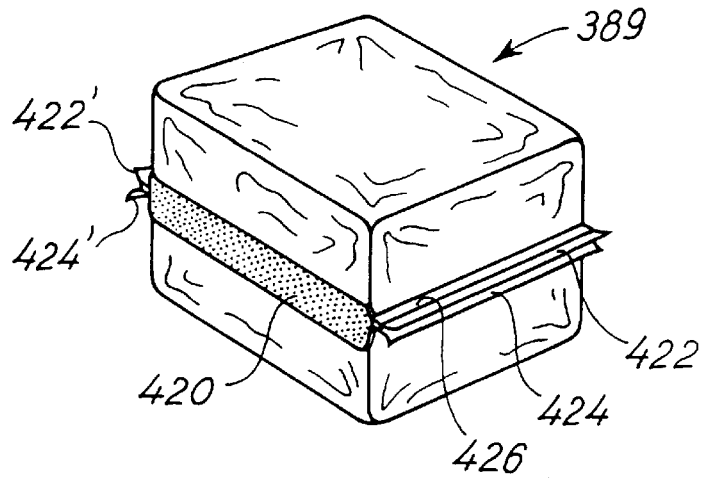
Figure 21:
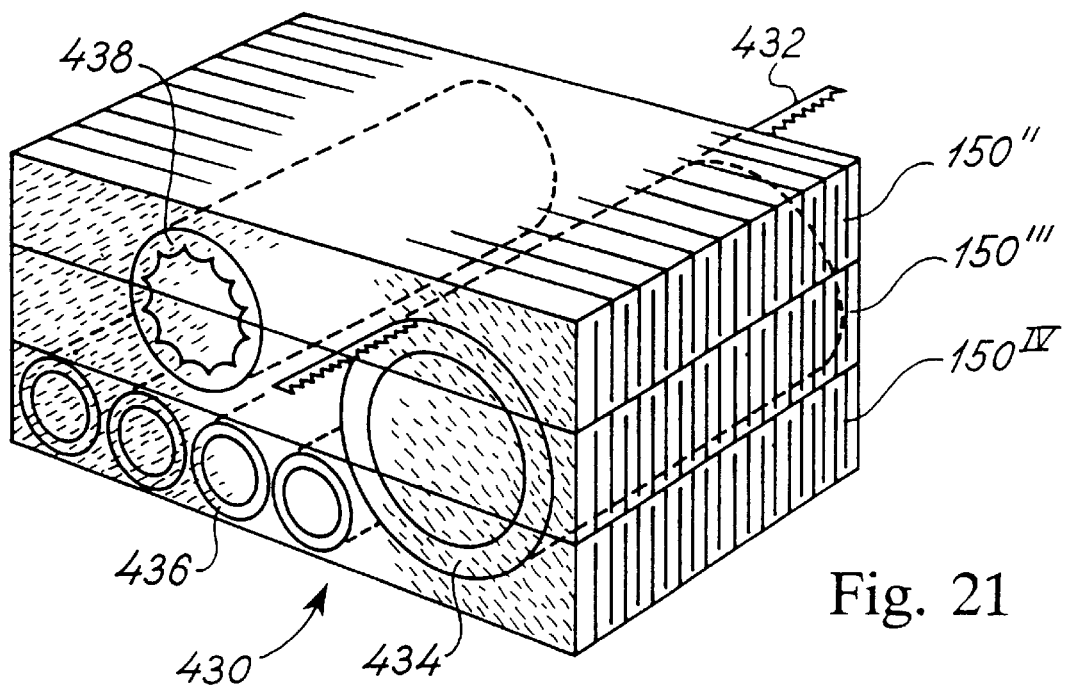
Figure 22:
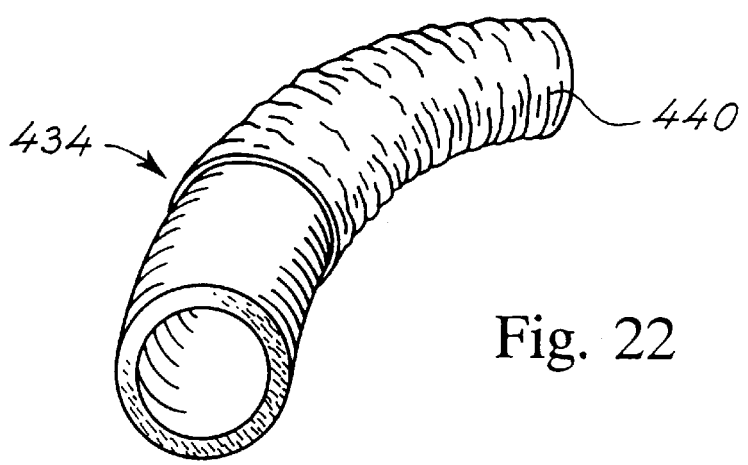
Figure 23:
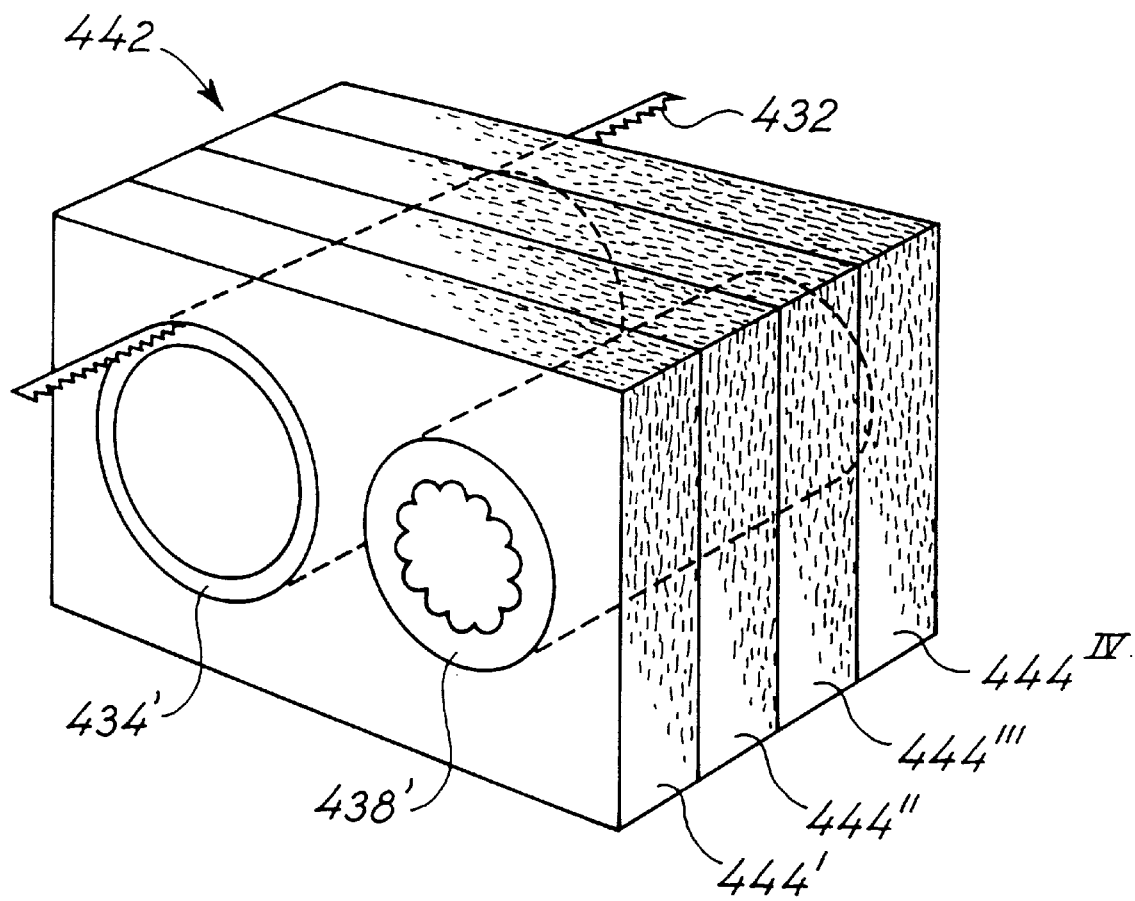
Figure 24:
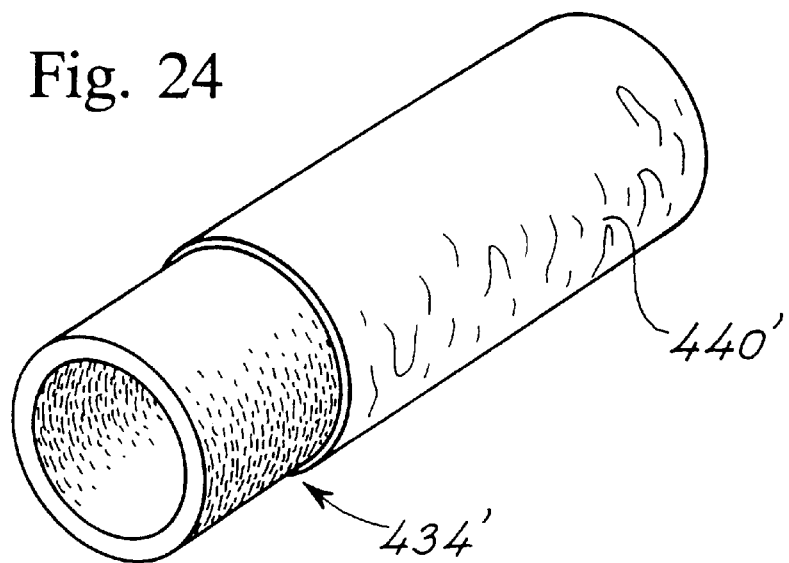

The present invention will now be further described with reference to the drawings, in which FIG. 1 is a schematic and perspective view illustrating a production plant for the production of a mineral fiber web according to the present invention, FIG. 2 is a schematic and perspective view illustrating in greater details a production step of the production of the mineral fiber web also illustrated in FIG. 1, FIG. 3 is a schematic and perspective view similar to the view of FIG. 2 illustrating an additional production step of the production of the mineral fiber web shown in FIGS. 1 and 2, FIG. 4a is a schematic and perspective view illustrating a first embodiment of a process of separating a part of the mineral fiber web therefrom and further of processing the part of the mineral fiber web, FIG. 4b is a schematic and perspective view illustrating a second or alternative embodiment of the process also shown in FIG. 4a of separating and processing a part of the mineral fiber web, FIG. 5 is a schematic and perspective view illustrating production steps of combining separate surface layers produced in accordance with one of the production steps shown i FIGS. 4a and 4b and a central mineral fiber web produced in accordance with the production process shown in FIG. 1, of curing the combined mineral fiber web and of separating the cured mineral fiber web into plate segments, FIG. 6 is a schematic and perspective view illustrating an initial production step of producing a combined mineral fiber web of two layers of different compactness to be processed in the production plant shown in FIG. 1 in accordance with the teachings of the present invention, FIG. 7 is a schematic and perspective view illustrating alternative production steps of separating the cured mineral fiber web into a total of four separate mineral fiber webs to be further processed through the application of surface layers to the outer surfaces of the four separate mineral fiber webs, FIG. 8 is a schematic, sectional and perspective view of a first embodiment of a mineral fiber plate segment produced in accordance with the teachings of the present invention, FIG. 9 is a schematic, sectional and perspective view of a second embodiment of a mineral fiber product produced in accordance with the teachings of the present invention, FIG. 10 is a schematic, sectional and perspective view of a third embodiment of a mineral fiber product produced in accordance with the teachings of the present invention, FIG. 11 is a schematic, sectional and perspective view of a fourth embodiment of a mineral fiber product produced in accordance with the teachings of the present invention, FIG. 12 is a schematic, sectional and perspective view of a fifth embodiment of a mineral fiber product produced in accordance with the teachings of the present invention and of a structure similar to the structure of the fourth embodiment shown in FIG. 11, FIG. 13 is a schematic, sectional and perspective view of a sixth embodiment of a mineral fiber product constituting a mineral fiber plate segment, FIG. 14 is a schematic, sectional and perspective view of a seventh embodiment of a mineral fiber plate segment produced in accordance with the teachings of the present invention, FIG. 15 is a schematic, sectional and perspective view illustrating an advantageous property of the mineral fiber product constituting a mineral fiber plate segment produced in accordance with the teachings of the present invention, FIG. 16 is a schematic, sectional and perspective view of an eighth embodiment of a mineral fiber product produced in accordance with the teachings of the present invention, FIGS. 17a and 17b are diagrammatic views illustrating the fire resistance characteristics of mineral fiber plate products produced in accordance with the teachings of the present invention as compared to conventional mineral fiber plate products, and FIGS. 18a and 18b are schematic and perspective views illustrating a technique of packaging mineral fiber plates according to the present invention in a highly compressed and compacted state, FIG. 19 is a schematic and perspective view illustrating a packaging plant for the packaging of mineral fiber plates according to the present invention in a highly compressed and compacted state, FIG. 20 is a schematic and perspective view similar to the view of FIG. 18b illustrating a package containing mineral fiber plates produced in accordance with the technique illustrated in FIG. 19, FIG. 21 is a schematic and a perspective view of a set of mineral fiber plates according to the present invention from which tubular insulating elements are produced of various configurations and exhibiting a high degree of flexible capability, FIG. 22 is a schematic and perspective view of a tubular insulating element produced in accordance with the technique disclosed in FIG. 21 and illustrating the high flexibility of the tubular insulating element, FIG. 23 is a schematic and perspective view similar to the view of FIG. 21 of a set of mineral fiber plates from which tubular insulating elements are produced in various configurations, and FIG. 24 is a schematic and perspective view similar to the view of FIG. 22 illustrating a tubular insulating element produced in accordance with the technique illustrated in FIG. 23.

In the upper left hand part of FIG. 1, a first station for carrying out a first step of producing a mineral fiber web is disclosed. The first step involves the formation of mineral fibers from a mineral fiber forming melt which is produced in a furnace 10 and which is supplied to a spout 12 of the furnace 10 to one or more rapidly rotating spinning wheels 14 to which the mineral fiber forming web is supplied as a mineral fiber forming melt stream 16. As a mineral fiber forming melt stream 16 is supplied to the spinning wheel or wheels 14 in a radial direction relative thereto, a cooling gas stream is simultaneously supplied to the rapidly rotating spinning wheel or wheels 14 in the axial direction thereof causing the formation of individual mineral fibers which are expelled or sprayed from the rotating spinning wheel or wheels 14 as indicated by the reference numeral 18. The mineral fiber spray 18 is collected on a continuously operated first conveyor belt 22 and forms a primary mineral fiber web 20 which is transferred from the first conveyor belt 22 to a second conveyor belt 24. A heat hardening or heat curable bonding agent is also added to the primary mineral fiber web 20 either directly thereto or at the stage of expelling the mineral fibers from the spinning wheel or wheels 14, i.e. at the stage of forming the individual mineral fibers 18. The first conveyor belt 22 is sloping relative to the horizontal direction and relative to the second conveyor belt 24 which is arranged substantially horizontally. The first conveyor belt 22 constitutes a collector conveyor belt, whereas the second conveyor belt 24 constitutes a transport conveyor belt.

From the second conveyor belt 24, the primary mineral fiber web 20 is transferred to a second station designated the reference numeral 26 in its entirety. The station 26 constitutes a station in which the overall direction of transportation of the primary mineral fiber web 20 is transformed from the longitudinal direction defined by the first and second conveyor belts 22 and 24, respectively, to a longitudinal direction determined by a mineral fiber web 30. The mineral fiber web 30 constitutes a mineral fiber web from which the mineral fiber products are produced in accordance with the teachings of the present invention as will be evident from the below description. The mineral fiber web 30 is a mineral fiber web originating from a directly collected primary mineral fiber web 20 and consequently contains mineral fibers predominantly arranged or orientated in the longitudinal direction of the mineral fiber web 30. Thus, the mineral fiber web 30 defines a first longitudinal direction and a first transversal direction, the first longitudinal direction being the direction along which the mineral fibers of the mineral fiber web 30 is predominantly arranged or orientated.

The mineral fiber web 30 is transferred from the station 26 by means of conveyor belts, not shown in FIG. 1, to a roller 28 which serves the purpose of shifting the direction of transportation of the mineral fiber web 30 from a substantially horizontal direction to a substantially vertical direction as indicated by an arrow 36 for the transfer of the mineral fiber web 30 to a further station in which the mineral fiber web 30 is transformed into a segmentary mineral fiber web 50 by arranging segments of the mineral fiber web 30 in partly mutually overlapping relationship and transversely relative to the longitudinal direction and the transversal direction of the segmentary mineral fiber web 50 for the formation of the segmentary mineral fiber web 50. The transformation of the mineral fiber web 30 into the segmentary mineral fiber web 50 is accomplished by means of two pendulum or oscillating conveyor belts 32 and 34 having upper input ends to which the mineral fiber web 30 is input and lower horizontally oscillating output ends from which the mineral fiber web 30 is output constituting segments which are arranged in the above-described partly overlapping relationship for the formation of the segmentary mineral fiber web 50.

In FIG. 1, two segments designated the reference numerals 38 and 40, respectively, are shown constituting segments of which the segmentary mineral fiber web 50 is composed. The segment 40 is defined by opposite folds 44 and 46 connecting the segment 40 to a previously produced segment and to the segment 38, respectively. The segment 38 is further defined by a fold 48 through which the segment is connected to the mineral fiber web 30 extending substantially vertically to the pendulum conveyors 32 and 34. The segmentary mineral fiber web 50 is moved from a position below the pendulum conveyor belts 32 and 34 to the right in FIG. 1 towards a further processing station 56 comprising two height compressing or compacting conveyor belts 52 and 54 which serve the purpose of compacting and homogenizing the segmentary mineral fiber web 50. In FIG. 1, the reference numeral 42 designates a front edge of the segment 38 which front edge constitutes a boundary line between the segments 38 and 40 of the segmentary mineral fiber web 50.

It is to be realized that the segmentary mineral fiber web 50 is composed of segments originating from the mineral fiber web 30 in which the mineral fibers are predominantly arranged or orientated along the longitudinal direction of the mineral fiber web 30 and the mineral fibers of the segmentary mineral fiber web 50 is consequently predominantly arranged or orientated in directions determined by the position of the individual segments of the segmentary mineral fiber web 50 such as the segments 38 and 40. Thus, the segments 38 and 40 contain mineral fibers which are predominantly arranged tranversely relative to the longitudinal direction of the segmentary mineral fiber web 50 and transversely relative to one another. The transverse directions along which the mineral fibers of the segmentary mineral fiber web 50 are arranged is basically defined by the ratio between the speed of transportation of the mineral fiber web 30 and the speed of transportation of the segmentary mineral fiber web 50, i.e. the ratio between the speed of transportation of the conveyor belt by means of which the mineral fiber web 30 is fed to the pendulum conveyors 32 and 34 and the speed of transportation of the conveyor belt by means of which the segmentary mineral fiber web is transferred from the pendulum conveyor belts 32 and 34 towards the station 56. Through the alternation of the ration between the above described speeds of transportation of the mineral fiber 30 and the segmentary mineral fiber web 50, the partly mutually overlapping relationship of the segments of the segmentary mineral fiber web 50 is adjustable and also the overall orientation of the mineral fibers of the segmentary mineral fiber web 50 along the transverse directions along which the mineral fibers of the segmentary mineral fiber web 50 are predominantly arranged or orientated.

The conveyor belts 52 and 54 of the height compressing or compacting station 56 are of a wedge-shaped configuration providing a compression of the segmentary mineral fiber web 50 at least at the output end of the compacting station 56 and are operated so as to cause a vertical pendulum motion of the segmentary mineral fiber web 50 at the output end of the compacting station 56. Consequently, the compacting station 56 causes an overall homogenization through rearrangement of mineral fibers producing a homogene mineral fiber web which is output from the compacting station 56 in a vertical pendulum motion to a further processing station 64 in which the mineral fiber web is further processed for the formation of a folded mineral fiber web.

In the processing station 64, the mineral fiber web output from the compacting station 56 is folded for the formation of a mineral fiber web in which the mineral fiber web output from the compacting station 56 is folded vertically and consequently transversally or perpendicularly relative to the longitudinal direction of the mineral fiber web and parallel with the transversal direction of the mineral fiber web. The folded mineral fiber web is produced by means of two conveyor belts 58 and 62 sandwiching the mineral fiber web and providing a further deceleration of the rate of transportation of the mineral fiber web into the compacting station and consequently a vertical folding of the mineral fiber web.

From the station 64, the vertically folded mineral fiber web is input to a further station 72 comprising two conveyor belts 66 and 68 which further decelerates the speed of transportation of the folded mineral fiber web 60 for the formation of a compacted and homogenized folded mineral fiber web 70. The mineral fiber web 70 constitutes a final product which may further be processed as will be described below for the formation of the specific mineral fiber products such as insulating plates or composite products.

In FIG. 2, the segmentary mineral fiber web 50 is shown in greater details illustrating the segments 38 and 40 and further the edges 46 and 48. FIG. 2 further illustrates in greater details the predominant arrangement or orientation of the mineral fibers of the individual segments of which the segmentary mineral fiber web 50 is composed.

In FIG. 3, the folded mineral fiber web 60 and further the compacted and homogenized folded mineral fiber web 70 are shown illustrating the structure of the webs. In the lower right hand part of FIG. 3, two lamellae or segments of the mineral fiber web 70 are shown designated the reference numerals 74 and 80. The lamella or segment 74 further discloses two subsegments 76 and 78 which are interconnected through a line of separation designated the reference numeral 77. The line 77 originates from an edge such as the edge 42 shown in FIGS. 1 and 2 of the arrangement of the segments such as the segments 38 and 40 of which the segmentary mineral fiber web 50 are composed in the partly mutually overlapping relationship in which the segments are positioned. Thus, in FIG. 3, the subsegments 76 and 78 contain mineral fibers which are predominantly arranged or orientated in transverse directions relative to the longitudinal and transversal directions of the mineral fiber web 70 and further relative to one another. In FIG. 3, the reference numeral 84 designates an arrow representing the longitudinal direction of the mineral fiber web 70. Similarly, the reference numerals 83 and 85 designate arrows representing the transversal direction and the elevational direction, respectively, of the mineral fiber web 70. In the below description, the expression "the longitudinal direction" refers to the direction indicated by the arrow 84 in FIG. 3 rather than a specific orientation or direction of a product relating to the geometrical relations of the product. Thus, the expression "the longitudinal direction" refers to any direction coinciding with the direction indicated by the arrow 84 shown in FIG. 3 and referring to the direction perpendicular to the direction of folding the web and further perpendicular to the folds of the folded product. Similarly, in the below description, the expression "the transversal direction" refers to a direction along the folds of the product and the expression "the elevational direction" refers to a direction perpendicular to the longitudinal direction and the transversal direction rather than a vertical direction in relation to the gravitational field. Thus, the elevational direction refers to the direction along which the folds of the product are produced. It is to be emphasized that the above three directions, i.e. the longitudinal direction, the transversal direction and the elevational direction of any product according to the present invention refer to the geometrical relations of the folds of the products rather than the orientation relative to horizontal and vertical directions as referring to the gravitational field.

FIG. 3 further illustrates a specific characteristic of the mineral fiber web 70 as the line 77 separating the subsegments 76 and 78 from one another are shifted from the segment 78 to the segment 80 and further to the adjacent segments basically determined by the ratio of overlapping ratio of the segmentary mineral fiber web 50 such as the segments 38 and 40 and the height of the foldings of the folded and compacted mineral fiber web 70 such as the segments 74 and 80. It is to be realized that the indication of the predominant orientation of the mineral fibers of the mineral fiber webs described above is somewhat exaggerated for illustrative purposes exclusively. In a specific product, the predominant orientation of the mineral fibers of the segments of the product may be less distinct as compared to the views of the drawings.

In FIGS. 4a and 4b, additional or supplementary processing steps are disclosed. In FIG. 4a, the mineral fiber web 30 is shown in the upper part of FIG. 4a and is transported towards a rotating circular knife 86 by means of which a segment layer 88 is separated from the mineral fiber web 30. The segment layer is moved past a propeller roller and along two sloping conveyor belts 92 and 94 serving the purpose of arranging segments of the segment layer 88 in partly mutually overlapping relationship for the formation of a transversely folded mineral fiber web 100 similar to the web 50 described above with reference to FIG. 1. In FIG. 4a, a segment of the transversely folded mineral fiber web 100 is defined between two outer folds 96 and 98 of the mineral fiber web. The segmentary mineral fiber web 100 is input to a compacting and homogenizing station 102 which differs from the compacting station 56 described below as the compacting station 102 comprises a plurality of rollers which serve the purpose of height compressing the mineral fiber web which is moved through the compacting and homogenizing station 102. From the compacting and homogenizing station 102, a compact and homogenized mineral fiber web 104 is output and moved into contact with a further circular rotating knife 106 which separates the mineral fiber web 104 into two substantially identical mineral fiber webs designated the reference numeral 108 and 110 which are moved past additional rollers 112 and 114 for transferring the mineral fiber webs 108 and 110 to a further processing station to be described below with reference to FIG. 5.

In FIG. 5, the folded and compacted mineral fiber web 70 produced as described above with reference to FIG. 1, is brought into contact with the mineral feber webs 108 and 110 which are produced as described above with reference to FIG. 4a. The mineral fiber webs 108 and 110 are applied to opposite side surfaces of the folded and compacted mineral fiber web 70 by means of two pressure rollers 134 and 136 which force the mineral fiber webs 108, 70 and 110 into intimate contact with one another optionally through the application of additional adhesive material such as additional bonding or curing agents which are applied to the surfaces of the mineral fiber webs 108 and 110 and/or the outer side surfaces of the folded and compacted mineral fiber web 70 which are brought into contact with one another. Through the contacting of the mineral fiber webs 108 and 110 to the folded and compacted mineral fiber web 70, a composite mineral fiber web 140 is produced which is thereupon introduced into a curing oven section 141 shown in the central part of FIG. 5 and comprising two curing oven parts 142 and 143 which are positioned above and below the composite mineral fiber web 140, respectively.

From the curing oven section 141, a cured composite mineral fiber web 150 is output and moved to a further station in which a cutting knife 144 separates the cured composite mineral fiber web 100 into separate mineral plate segments which are thereupon moved from the production plant for storage, further processing or packaging. In FIG. 5, a mineral fiber plate product produced by separating the product from the cured composite segmentary mineral fiber webs 50 is designated the reference numeral 146. The composite mineral fiber plate product 146 comprises a central core 148 and opposite surface layers 147 and 149 and is to be described in greater details below with reference to FIG. 8. It is to be realized that the technique of applying a top and bottom layer to the folded and compacted mineral fiber web 70 may be amended by deleting one of the layers such as the top layer or alternatively the bottom layer constituted by the web 108 and 110, respectively, or by applying e.g. a foil or foils to one or both sides of the folded and compacted mineral fiber web 70.

In FIG. 4b, an alternative technique of producing a separate mineral fiber web to be used for the formation of a top or bottom layer of the final composite mineral fiber product is disclosed differing from the technique disclosed in FIG. 4a in that a top surface layer 118 is separated from the initial mineral fiber web 20 which is transported in its longitudinal direction thereof and which is input to a horizontally and transversally operated cutting belt or knife 121. The initial mineral fiber web 20 is transported to the belt or knife 121 by means of a conveyor belt 121. The belt or knife 121 divides the input mineral fiber web 20 into a top layer 118 and a major part from which the mineral fiber web 30 is produced. The top layer is moved from the belt or knife 121 by means of a conveyor belt 118 and input to two sandwiching conveyor belts 128 and 132 which serve the purpose of compacting or homogenizing the mineral fiber web which is output from the sandwiching conveyor belts 128 and 132 and which is designated the reference numeral 130.

The mineral fiber web 130 may constitute a web which is further processed as described above with reference to FIG. 4a and consequently separated into two parts for the formation of top and bottom layers of the final composite mineral fiber product or alternatively be folded, further compacted or homogenized for producing a high strength top and or bottom layer of the final composite mineral fiber product. The mineral fiber web 30 produced from the initial mineral fiber web 20 by the separation of the top layer 118 therefrom is moved from the belt or knife 121 by means of two conveyor belts 122 and 124 and has its direction of transportation shifted e.g. as shown in FIG. 1 by means of the station 26 prior to the step of inputting the mineral fiber web 30 into the pendulum conveyor belts serving the purpose of arranging segments of the mineral fiber web 30 in partly mutually overlapping relationship as described above with reference to FIG. 1. In FIG. 4b, the pendulum conveyor belt 34 is also shown.

In FIG. 6, a further processing station is shown in which a mineral fiber web 50' originating from the mineral fiber web 50 shown in FIG. 1, however, optionally partly compressed is transferred along a conveyor belt 153 to a separation station in which a separating assembly 154 comprising a movable cutting belt 156 divides the mineral fiber web into two separate mineral fiber webs or parts designated the reference numerals 158 and 160. The part 160 is moved through two sets of sandwiching conveyor belts comprising a first set 162 and 164 and a second set 166 and 168 to a collector conveyor belt 170. The first and second sets of conveyor belts 162, 164 and 166, 168, respectively, may produce a compacting and homogenization of the mineral fiber web 160 as described above. The mineral fiber web 158 is also input to two sandwiching conveyor belts 172 and 174 and further into a compacting and homogenizing station 176 similar to the station 102 described above with reference to FIG. 4a for producing a compacted mineral fiber web 178 which is transferred from the compacting station 176 to the mineral fiber web transferred along the conveyor belt 170 by means of a further conveyor belt 180. By means of the conveyor belt 180, the compacted and homogenized mineral fiber web 178 is positioned on top of the mineral fiber web originating from the mineral fiber web 160 and optionally partly compacted and homogenized as stated above producing a composite mineral fiber web 182 comprising of a high compacted top layer and a somewhat less compacted bottom layer. The top and bottom layers may be adhered to one another by means of heat curable or hardenable bonding agents originally present in the mineral fiber web 30 or alternatively by means of a heat curable or hardenable bonding agent constituting an adhesive which is applied to the top and/or bottom layers prior to the step of contacting the top and bottom layers with one another together defining the composite mineral fiber web 182. In FIG. 6, the separating assembly 154 may be shifted from the positioned shown in FIG. 6 towards the conveyor belt 162 by means of a drive motor not shown in the drawings in order to alter the thickness of the mineral fiber web 158 as compared to the thickness of the mineral fiber web 160. In its extreme position the separating assembly 154 is prevented from separating the mineral fiber web 50' into the mineral fiber webs 158 and 160 as the mineral fiber web 130 is in its entirety forced into contact with the sandwiching conveyor belts 162 and 164.

In the left hand part of FIG. 7, the above-described curing oven section 141 comprising the top and bottom curing oven sections 142 and 143 is shown. In FIG. 7, the mineral fiber web which is output from the curing oven sections 141 is designated the reference numeral 150' as the mineral fiber web 150' differs from the cured composite mineral fiber web 150 described above with reference to FIG. 5 in that the mineral fiber web 150' is produced solely from the folded and compacted mineral fiber web 70 without the addition of the top and bottom layers produced from the mineral fiber webs 108 and 110. The cured mineral fiber web 150' is input to a wire or belt separator comprising a wire or belt 184 which is journalled on two rotatable wheels 186 and 188 which cause the wire or belt 184 to be moved horizontally and transversally relative to the mineral fiber web 150' causing a separation of the mineral fiber web 150' into two parts 192 and 194.

By means of a rotating circular knife 196 similar to the above-described rotating circular knives 86 and 106, the parts 192 and 194 are further divided into a total of four webs 198, 200, 202 and 204. From two rollers 208 and 210 positioned above the top mineral fiber webs 198 and 200, two foils 209 and 211 are applied to the upper surfaces of the top webs 198 and 200, respectively, and fixated to the top surfaces thereof by means of a sewing mechanism or alternatively by means of an adhesive as illustrated schematically at 216. After the adhesion of the foils 209 and 211 to the top webs 198 and 200, two top surface covered webs 220 and 222 are produced which are wound in a spiral configuration as shown schematically in the upper right hand part of FIG. 7.

Similarly, two foils are applied to the lower sides of the bottom webs 202 and 204 which foils are supplied from two rolls 212 and 214, respectively, providing two foils one of which is designated the reference numeral 215. The foil 215 is applied to the lower side of the web 204, whereas the foil applied to the lower side of the web 202 is not visible in FIG. 7. In a station 218 similar to the station 216 described above, the foils supplied from the rolls 212 and 214 are fixated to the lower sides of the webs 202 and 204 for the formation of composite bottom surface covered webs 224 and 226 similar to the above-described composite webs 220 and 222.

In FIG. 8, a fragmentary and perspective view of the first embodiment of a mineral fiber plate assembly 146 is shown produced from the mineral fiber web 150 shown in FIG. 5. The mineral fiber plate assembly 146 comprising the central core or body 148 is produced from the mineral fiber web 70 shown in FIGS. 1 and 5. The central core or body 148 is produced from the compacted mineral fiber webs 108 and 110 as described above with reference to FIG. 5. The central core or body 148 i s as described above with reference to FIGS. 1–3 composed of a plurality of transversely positioned segments 228, 230 and 236 which are produced from the mineral fiber web 30 shown in FIG. 1 through the arranging of the segments such as the segments 38 and 40 of the mineral fiber web 30 in partly mutually overlapping relationship through folding of the mineral fiber web 30 along a direction transversely relative to the longitudinal and transversal directions of the segmentary mineral fiber web 50 produced through the folding process. The segments 228 and 230 constitute segments which are arranged perpendicular to the opposite surface layers 146 and 147 and are connected through a connection segment 232. In FIG. 8, a further segment of the central core or body 148 is designated the reference numeral 236 and is positioned adjacent to the segment 232 and connected thereto through a connector segment 234 similar to the segment 232. The segment 228 further discloses, as is evident from FIG. 8, a structure similar to the structure of the segments 78 and 80 shown in FIG. 3 and comprises two subsegments 237 and 239 which are interconnected through a segment 238 originating from a line similar to the line 77 shown in FIG. 3. The subsections 237 and 239 each comprise mineral fibers predominantly arranged or positioned along respective directions which are positioned transversely relative to the longitudinal and transversal directions defined by the mineral fiber assembly 146 and further relative to one another.

The segments 230 and 236 like the other segments of the structure shown in FIG. 3 also includes mineral fibers which in varying subsegments of the individual segments include mineral fibers predominantly arranged or 30 positioned along the above-described transverse directions. The overall structure of the central core or body 148 of the mineral fiber plate assembly 146 provides through the arrangement or positioning of the mineral fibers of the individual subsegments such as the subsections 237 and 239 a mineral fiber structure comprising mineral fiber structure predominantly comprising mineral fibers arranged transversely relative to the main directions, i.e. the longitudinal and transveral directions of the mineral fiber plate assembly 146 further providing internal mineral fiber crossings within the structure providing on the one hand excellent mechanical characteristics as to mechanical strength and bending properties and on the other hand excellent insulating properties as compared to conventional high strength and high insulating mineral fiber plate assemblies, respectively.

In FIG. 9, a second embodiment of a mineral fiber product is shown comprising the above-described central core or body 148 which is provided with a top surface covering constituted by a covering of a continuous foil or a mesh 246 made from a plastics material or alternatively a metal mesh material. The central core or body 148 may apart from the top surface covering 246 be provided with a bottom surface covering not shown in FIG. 9. The top surface covering 246 may be applied to the central core or body 248 before or after the curing station 141 shown in FIG. 5. depending on the properties of the material of the top surface covering and the ability of the material of the top surface covering to adhere to the central core or body 148 through melting, adhesion, sewing etc.

In FIG. 10, a third embodiment of a mineral fiber product 240 is shown comprising the central core or body 148 described above with reference to FIG. 8. The central core or body 148 is at opposite side surfaces thereof provided with two surface coverings 242 and 244 which may constitute water and air impermeable sealings or alternatively reinforcing films or foils or further alternatively IR reflecting foils such as aluminum foils.

In FIG. 11, a fourth embodiment of a mineral fiber product 250 is shown comprising lamellae 255, 256 and 257 which are produced from the mineral fiber web 70 shown in FIG. 1 and, as discussed above with reference to FIG. 5, cut into individual plate segments which are thereupon turned 90° in accordance with the technique described in international patent application, international application No. PCT/DK91/00383, international publication No. WO92/10602. The lamellae 255, 256 and 257 are thereupon adhered to intermediate compacted mineral fiber layers 251, 252, 253 and 254 for providing a three lamella composite structure shown in FIG. 11. Along cutting lines 258 and 259, the composite structure composed of the lamellae 255, 256 and 257 and the compacted surface layers 251, 252, 253 and 254 is divided into separate mineral fiber plates.

In an alternative process of producing the assembly shown in FIG. 11, the lamellae 255, 256 and 257 are adhered to the compacted surface layers 251, 252, 253 and 254 prior to the curing of the bonding agent present within the webs from which the lamellae 255, 256 and 257 are produced. In this alternative process, the surface layers 251, 252, 253 and 254 are also preferably constituted by uncured compacted mineral fiber containing components which are adhered through an additional heat curable or hardenable bonding material to the uncured lamellae 255, 256 and 257 or alternatively through the uncured bonding agents of the lamellae 255, 256 and 257 and the intermediate uncured mineral fiber components 251, 252, 253 and 254. Further alternatively, the assembly shown in FIG. 11 may be produced from uncured lamellae and previously cured surface components or alternatively cured lamellae and uncured surface components which are thereupon introduced into the curing oven for curing the uncured mineral fiber bonding agents and any heat curable or hardenable bonding material used for adhering the lamellae and the surface layers together.

In FIG. 12, a slightly modified embodiment of the composite structure of FIG. 11 is shown constituting a fifth embodiment 260 of the mineral fiber product according to the present invention. The fifth embodiment or mineral fiber plate assembly 260 comprises lamellae 262 similar to the lamellae 255, 256 and 257 described above with reference to FIG. 11. The lamellae 262 are positioned having one of its segments similar to the segments 228, 230 and 236 of the central core or body 148 positioned in facial contact with a foil 244 which may constitute a supporting foil or a water and air impermeable membrane. Between the lamellae 262, compacted mineral fiber elements 264 and 266 are interposed constituting reinforcing elements similar to the above-described compacted surface layers 251, 252, 253 and 254 of the assembly 250 described above with reference to FIG. 11. The assembly 260 shown in FIG. 12 may be divided into separate mineral fiber plate products comprising a single lamella 262 or a plurality of lamellae 262.

In FIG. 13, the central core or body 148 of the composite mineral fiber plate product 146 shown in FIGS. 5 and 8 is disclosed in greater details. In FIG. 13, the fiber structure of the lamella or segment 228 is shown clearly illustrating that the subsections 237 and 239 comprise mineral fibers which are predominantly arranged along a single transverse direction relative to the longitudinal, transversal and vertical direction defined by the central core or body 148 whereas the segment 238 originating from a line of separation corresponding to the line 77 shown i FIG. 3 comprises mineral fibers arranged or orientated transversely relative to one another.

In FIG. 14, a seventh embodiment of a mineral fiber plate segment is shown designated the reference numeral 270 in its entirety. The segment 270 is composed of a central core or body 274 and a top layer 272. The top layer 272 is basically of a structure similar to the structure of the bottom and top layers 147 and 149, respectively, of the composite mineral fiber plate 146 shown in FIG. 8. The central core 274 of the mineral fiber plate segment 270 is produced from the composite mineral fiber web 182 described above with reference to FIG. 6 and includes a central filling out designated the reference numeral 276 which is a high compactness central filling out produced from the compacted and homogenized mineral fiber web 178 of the composite mineral fiber web 182. The part 276 may alternatively be produced from a different basic web including mineral fibers arranged or positioned in any appropriate orientation and of any appropriate compactness higher or lower than the compactness of the remaining part of the central core or body 274 which remaining part is produced from the web 160 in accordance with the teachings of the present invention and consequently comprises segments similar to the segments of the central core or body 148 described above, i.e. the segments 228, 232 and 236. Thus, the central core or body 274 presents two subsegments 278 and 280 corresponding to the subsegments 237 and 239, respectively, of the lamella or segment 228 described above with reference to FIGS. 8 and 13 and further a narrow segment 279 corresponding to the segment 238 of the lamella or segment 228 shown in FIGS. 8 and 13.

In FIG. 15, a highly advantageous characteristic of a mineral fiber plate produced in accordance with the teachings of the present invention is shown. In the left hand part of FIG. 15, a folded mineral fiber plate is shown designated the reference numeral 284. The plate 284 comprises lamellae or segments one of which constituting the top segment is designated the reference numeral 286. The plate 284 defines in its relaxed position shown in the left hand part of FIG. 15 an overall heigth of $h_1$. Provided the plate 284 is exposed to a pressure force or pressure impact, the height of the mineral fiber plate is reduced from the height $h_1$ to the height $h_2$ indicated in the right hand part of FIG. 15 which also discloses the somewhat compressed mineral fiber plate designated the reference numeral 284' including the top segment or layer which in the compacted plate 284' is designated the reference numeral 286'.

It is to be emphasized that the pressure or force impact which causes a reduction of the height of the mineral fiber plate 284 from $h_1$ equal to 60 cm to $h_2$ equal to 30 cm is merely of the order of 12–18 kPa. Whereas the mineral fiber plate 284 may be compressed in the vertical direction as shown in FIG. 15, the plate is extremely strong and basically incompressible in directions along the horizontal and transversal directions defined by the lamellae or segments of the composite plate structure. The mineral plate product 284 is consequently-highly advantageous in connection with insulating building structures which often require adjustment of one of the dimensions of an insulating plate in accordance with the specific dimensions of the building structure in question. Instead of reducing the size of a insulating plate to be used in a building structure, the mineral fiber plate product 284 is easily adapted to specific dimensional requirements as the product along one direction which may constitute the length or the width of the plate may be reduced up till a factor 50% by simple compressing the plate product. The property disclosed in FIG. 15 is further advantageous from a packagning and transportion point of view as the mineral fiber plate product 284 may be stored, packaged and transported in a reduced volume as compared to the unrelaxed volume allowing a reduced packaging and transportation cost per plate unit.

The composite mineral fiber product produced in accordance with the technique described above with reference to FIG. 7 may constitute an insulating convering to be used in connection with boilers, vessels, pipes, tubings, tubes or the like in which heated water or steam are conducted. The insulating covering shown in FIG. 16 is in its entirety designated the reference numeral 290 and comprises a plurality of lamella one of which is designated the reference numeral 294 originating from the lamella or segments of the mineral fiber web 70 described above with reference to FIG. 1 and as is evident from FIG. 16 include mineral fibers orientated along transverse directions relative to the longitudinal direction of the lamella in question and also relative to one another. The insulating covering is provided with an outer foil 292.

Mineral fiber plate products produced in accordance with the teachings of the present invention and constituting implementations of the mineral fiber plate according to the present invention exhibit improved fire resistance characteristics as compared to similar conventional products. FIGS. 17a and 17b illustrate test conditions of a test which was carried out by the applicant for comparing a prototype embodiment of the mineral fiber plate according to the present invention and conventional mineral fiber plate products. Mineral fiber plates measuring 600 mm×900 mm and having a thickness of 120 mm were produced in accordance with the embodiment shown in FIGS. 13 and 15 and from the conventional fiber plate product in which the mineral fibers are predominantly arranged along a direction coinciding with the longitudinal or transversal direction defined by the major surfaces of the plate product. One sample of the mineral fiber plate according to the present invention and one sample of the conventional mineral fiber plate product were suspended horizontally within a furnace and exposed to elevated temperatures as the furnace was heated as illustrated in FIG. 17b in which four curves E, F, G and H are shown. Along the abscissa axis, the period of time since the initiation of the experiment of test is indicated, and along the ordinate axis the temperature is indicated. The curve E represents the control curve, i.e. the temperature response to which the samples were to be exposed within the furnace. The curves F, G and H represent the temperature measured within the furnace and at specific locations thereof. The samples constituted by the mineral fiber plate according to the present invention and the conventional mineral fiber plate product were visually monitored while suspended within the furnace. After 105 min, the experiment or test were terminated since the conventional mineral fiber plate product was deflected approximately 120 mm from the overall horizontal plane and was about to fall down, whereas the samples of the mineral fiber plate according to the present invention was merely deflected approximately 30 mm. During the experiment, the temperature at the sides of the samples opposite to the sides which were facing the furnace were monitored. The measuring results are shown in FIG. 17a, in which the abscissa represents the same time scale as shown in FIG. 17b and in which the ordinate axis represents the temperature at the sides of the samples opposite to the sides facing the furnace. Four curves, A, B, C and D are shown in FIG. 17a. The curves A and B represent the measuring results of the sample of the mineral fiber plate according to the present invention, and the curves C and D represent the measuring results of the conventional mineral fiber plate product.

The mineral fiber plates according to the present invention and the conventional mineral fiber plate products were analyzed. The mineral fiber plates according to the present invention contained 0.77 kg/mr$^3$ bonding agent and oil, and the conventional mineral fiber plate product contained 0.81 kg/m$^3$ bonding agent and oil.

Conclusion:

The reduced deflection of the mineral fiber plate according to the present invention as compared to the conventional mineral fiber plate products provides radically improved fire resistance characteristics or properties since the reduced reflection at extreme, elevated temperatures reduces the risk of the plate being deflected to such an extent that the plate firstly produces slots at the junction to adjacent mineral fiber plate and secondly falls down from the suspended state due to extreme deformation or collapse of the plate structure.

Although the analysis of the chemical composition of the constituents of the mineral fiber plate according to the present invention as compared to the conventional mineral fiber plate product revealed a slightly increased content of FeO, 8.3% as compared to 6.3%, the difference in content of FeO, however, itself is not large enough to explain the improved integrity of the mineral fiber plates according to the present invention as compared to the conventional mineral fiber plate products.

FIGS. 18a and 18b illustrate an advantageous technique of packaging mineral fiber plates according to the present invention in compacted state. According to the packaging technique illustrated in FIGS. 18a and 18b, the characteristic of the mineral fiber plate 284 shown in FIG. 15 is employed. In FIG. 18a, a total of four mineral fiber plates 284 are positioned vertically or standing on a first packaging foil 285 as the plates 284 are positioned having their longitudinal directions orientated vertically. On top of the plates 284, a second packaging foil 287 is positioned. A pressure plate 291 is lowered from a position above the second packaging foil 287 and the mineral fiber plates 284 causing a compression of the mineral fiber plates reducing the overall volume of the mineral fiber plates to approximately 40–60% of the initial volume of the mineral fiber plates. After the compression and compacting of the mineral fiber plates 284 producing compacted or compressed mineral fiber plates 284 similar to the plate shown in FIG. 15, the first and second packaging foils 285 and 287 are joined and sealed together in a heat sealing process or any equivalent sealing proces, e.g. a gluing process or a combined gluing and heat sealing process, so as to produce a sealed packaging foil 285 enclosing the compacted mineral fiber plates 284 within the sealed packaging foil producing a highly compact mineral fiber plates package 289 shown in FIG. 18b and having a volume constituting approximately 60–80% of the overall volume of the non-compacted and non-compressed mineral fiber plates.

The package 289, thus, comprises the compressed or compacted mineral fiber plates designated the reference numeral 284 and first and second package foil segments 285' and 287' which are joined together through two transversal seals 295 and 296 constituting front and rear seals, respectively. The mineral fiber plate according to the present invention constitute a product which may be packed within a sealing or enclosure such as a foil through the application of a compression ratio during the process of compacting the mineral fiber plate of approximately 50% providing a compression ratio of approximately 20% of the final compacted or compressed mineral fiber plate. The mineral fiber plate maintains its integrity due to its high compressive strength in its transversal and elevational directions. The mineral fiber plate further exhibits a reduced tendency as compared to conventional mineral fiber plate products to be deformed through the compacting or compressing process. Conventional mineral fiber plate products are often deformed through an increasing length and width provided the thickness of the product is reduced through compacting or compression. Therefore, conventional mineral fiber plate products are to some extent damaged and deformed through the compacting and compressing process. Furthermore, the damage and deformation of conventional mineral fiber plate products through the application of compacting or compression in the process of packaging the mineral fiber plate may reduce the elasticity of compression of the plate along the direction of compacting and compressing the plate. The possibility of packaging mineral fiber plates in a reduced volume occupying merely 60–80% of the initial volume of the mineral fiber plates or even less renders it possible to ship more mineral fiber plates in a single shipment as compared to non-compacted and non-compressed mineral fiber plates. The mineral fiber plates according to the present invention may recover to approximatly 100% of the original volume after the mineral fiber plates have been compacted to 60–80% of the initial volume or even less for an extended period of time.

The mineral fiber plate according to the present invention further exhibits a distinct advantage as compared to most conventional mineral fiber plate products which are stored in a non-compacted and non-compressed state within a packaging enclosure, such as a packaging foil of the type shown in FIG. 18b, or contained within a complete encapsulating foil similar to a foil to be described below with reference to FIG. 20, as those edges or corners of the conventionel mineral fiber plate products which are positioned at the outer edges and corners, respectively, of the package, are permanently deformed and consequently damaged by the packaging foil which is positioned encircling the mineral fiber plate products confining the mineral fiber plate products within a sealed package. Contrary to the conventional mineral fiber plate products, the mineral fiber plate according to the present invention exhibits a high integrity and mechanical strength which ensures that no part of the mineral fiber plates which are confined within a package, such as the package 289 shown in FIG. 18b, is permanently deformed or damaged. Thus, no part of the mineral fiber plates of the package 289 shown in FIG. 18b is permanently deformed or damaged by the process of sealing the mineral fiber plates within the foil of the package 289. Even those parts of the mineral fiber plates contained within the package 289 which are positioned at the outer edges or corners of the package 289 are not, contrary to conventional mineral fiber plate products, permanently deformed or damaged.

It is to be understood that the orientation of the mineral fiber plates 284 during the process of packaging the mineral fiber plates is arbitrary since the mineral fiber plates 284 which are positioned vertically in FIG. 18a may be positioned in any arbitrary orientation such as a horizontal position and piled on top of one another rather than positioned adjacent to one another as shown in FIG. 18a. Provided the mineral fiber plates 284 are positioned piled on top of one another in a substantially horizontal position, the pressure plate 291 or any equivalent compression or compacting means or tool is reciprocated horizontally for compacting the mineral fiber plate 284 along the longitudinal directions thereof employing the extreme compressibility of the mineral fiber plates according to the present invention along the longitudinal direction of the mineral fiber plates.

In FIG. 19, a presently preferred embodiment of a plant for the production of packages containing mineral fiber plates according to the present invention is shown. The plant is an on-line production plant in which a plurality of cured mineral fiber webs, such as four cured mineral fiber webs 150", 150'", 150$^{IV}$ and 150$^V$ or any other number of cured mineral fiber webs, are processed for producing mineral fiber plates contained within packages containing a total of four mineral fiber plates each or any other number of mineral fiber plates. The cured mineral fiber webs 150", 150'", 150$^{IV}$, 150$^V$ are moved forward on continuously operated rollers 300', 300", 300'" and 300$^{IV}$. Provided the cured mineral fiber webs 150", 150'", 150$^{IV}$, and 150$^{IV}$ are to be stopped, a finned plate element 301 is lifted by means of a motor 302 causing the cured mineral fiber webs to be lifted from the rollers 300', 300", 300'", and 300$^{IV}$. The cured mineral fiber webs 150", 150'", 150$^{IV}$ and 150$^V$ are transferred from the rollers 300', 300", 300'" and 300$^{IV}$ to a conveyor belt 304 which is supported on a drive roller 306 which is powered by a motor 308 and an idler roller 310. The cured mineral fiber webs 150", 150'", 150$^{IV}$ and 150$^V$ are as is illustrated in FIG. 19 positioned on the edges allowing that the cured mineral fiber webs may be compressed vertically as will be further discussed below. The cured mineral fiber webs 150", 150'", 150$^{IV}$ and 150$^V$ are received and supported between opposite conveyor belts 312 and 314 which are operated in syncronism with the conveyor belt 304 and serve the purpose of supporting the cured mineral fiber webs as the mineral fiber webs are introduced into a cutting machine 316.

The cutting machine 316 basically comprises a yoke-like support structure 318 which supports upper and lower runners 320 and 322 on which rotating wheels 324 and 326, respectively, are supported. The rotating wheels 324 and 326 are powered by a motor, not shown on the drawings, and supports a closed loop cutting string 328 which constitutes the cutting tool or cutting element of the cutting machine 316. As the cured mineral fiber webs 150", 150'", 150$^{IV}$ and 150$^V$ are moved passed the cutting machine 316 through the yoke-like frame 318 of the cutting machine to a predetermined distance beyond the cutting machine, the runners 320 and 322 are activated causing the runners to move towards the cured mineral fiber webs 150", 150'", 150$^{IV}$ and 150$^V$ causing the cutting string 328 to be forced through the cured mineral fiber webs and separating four mineral fiber plate segments from the cured mineral fiber webs 150", 150'", 150$^{IV}$ and 150$^V$. The cured mineral fiber plate segments separated from the cured mineral fiber webs are received on a conveyor belt 330 which is supported by two rollers 332 and 334 and are further supported by opposite, vertical conveyor belts 336 and 338 basically serving the same purpose as the above described conveyor belts 312 and 314, respectively, with the purpose of supporting the cured mineral fiber plate segments as the cured mineral fiber plate segments are propelled by the conveyor belt 330.

The mineral fiber plate segments are further advanced on a plurality of rollers one of which is designated the reference numeral 340 and are compressed by means of opposite, vertical conveyor belts 342, 344 and 346, 348. Provided the mineral plate segments are to be stopped, a finned plate segment 349 similar to the above described finned plate segment 301 is activated by means of a motor 350.

From the rollers comprising the roller 340, the mineral fiber plate segments which have been positioned and compressed for registering the individual mineral fiber plate segments properly are introduced into a packaging section 360 of the plant shown in FIG. 19. The packaging section 360 is shown in the lower part of FIG. 19 and comprises a horizontal lower conveyor belt 362 which is supported on rollers 364 and 366 and further includes a plurality of supporting rollers one of which is designated the reference numeral 368. Opposite the horizontal conveyor belt 362, a pressure applying conveying belt 370 is positioned which includes a first sloping section 372 and a second horizontal section 374. The conveyor belt 370 includes a plurality of rollers 376, 378, 380 and 382 serving the purpose of guiding the conveyor belt for producing the sloping section 372 and the horizontal section 374. The conveyor belt 370 further includes a plurality of support or pressure rollers 386 similar to the rollers 368 of the conveyor belt 362.

On the conveyor belt 362, a total of four sets 384', 384'" and 384$^{IV}$ are supported, each including four mineral fiber plate segments originating from the cured mineral fiber webs 150", 150'", 150$^{IV}$ and 150$^V$. Between the lower sides of the sets 384', 384", 384'" and 384$^{IV}$ and the upper side of the conveyor belt 362, a lower packaging foil 388 is confined which foil is supplied from a packaging foil supply roll 390. Similarly, an upper packaging foil 392 is confined between the upper sides of the sets 384', 384", 384'" and 384$^{IV}$ and the lower side of the sloping section 372 of the upper conveyor belt 370 which upper packaging foil is supplied from a packaging foil supply roll 394. As the sets 384', 384", 384'" and 384$^{IV}$ are advanced from left to right by means of the lower conveyor belt 362 and also the upper conveyor belt 370, which are moved in synchromism, the sloping section 372 of the upper conveyor belt 370 causes the sets to be compressed in a compressing process similar to the process described above with reference to FIGS. 15 and also FIG. 18a. During the process of compressing the sets 384', 384", 384'" and 384$^{IV}$, the packaging foils 388 and 392 are also advanced along with the individual sets and are introduced into a finalizing section of the packaging section comprising the horizontal section 374 of the upper conveyor belt 370 in which finalizing section the packaging foils 388 and 390 are joined together as will be readily described below. For initiating the process of joining the foils 388 and 392 together, opposite, vertical guiding plates 395 and 396 are provided which serve the purpose of folding the outer edges of the foil 388 upwardly allowing the outer longitudinal edges of the foils 388 and 392 to be joined together. For positioning the outer longitudinal edges of the foils 388 and 392 properly, a first set of rollers 398', 398" and 398'" is provided which serves the purpose of catching the outer longitudinal edge of the foil 388 and maintaining the outer longitudinal edge of the foil 388 in a stretched, downwardly bent position relative to the guide 396. Similarly, a second set of rollers 400', 400" and 400'" are provided, each comprising two individual rollers serving the purpose of catching the outer longitudinal edge of the upper packaging foil 392 for stretching the upper packaging foil 392 and for positioning the outer longitudinal edge of the upper foil 392 in proper overlying relationship relative to the downwardly bent outer longitudinal edge of the lower packaging foil 388. After the outer longitudinal edges of the upper and lower packaging foils 392 and 388, respectively, are properly positioned in overlapping relationship, the upper and lower packaging foils 392 and 388 are exposed to an air stream generated by a blower outlet 402 which serves the purpose of blowing away any excessive material from the outer side surfaces of the packaging foils and of stretching the packaging foils before the packaging foils are introduced into a sealing assembly 404 in which the upper and lower packaging foils 392 and 388 are heat sealed together by exposure to heat. After the heat sealing process, the heat sealed outer longitudinal edges of the packaging foils 392 and 388 are cooled by the supply of cooling air provided from a cooling air outlet 406. It is to be understood that elements similar to the first and second sets of rollers 398' etc. and 400' etc, respectively, the air outlet 402, the heat sealing assembly 404 and the cooling air outlet 406 are provided at the opposite side of the packaging machine at the guide 395.

From the upper and lower conveyor belts 362 and 370, the sets 384', 384", 384'" and 384$^{IV}$ are transferred to a heat sealing section 410 which comprises two opposite vertically reciprocating sealing claws comprising an upper clamp and a lower clamp 414 by means of which the upper and lower packaging foil 392 and 388, respectively, are joined together along the transversal, horizontal front and rear edges of the sets 384' etc. As the heat sealing clamps 412 and 414 are moved towards one another, causing the upper and lower packaging foils 392 and 388 to be jammed between the heat sealing clamps, a rearmost horizontal seal of a set of compressed and compacted mineral fiber plate segments is produced which set is already sealed along the front edge and the side edges thereof. Thus, a hermetically sealed set contained within a sealed package is produced. At the same time, a front horizontal seal is produced at the succeeding set. The clamps 412 and 414 preferably also includes a cutter serving the purpose of separating the preceeding finished package from the continuous upper and lower packaging foils 392 and 388, respectively, which package is received between opposite lower and upper conveyor belts 416 and 418. The lower conveyor belt 416 constitutes a horizontal conveyor belt, whereas the upper conveyor belt 418 includes a horizontal first section and a diverging and upwardly sloping second section. The first section serves the purpose of maintaining the finished package including a total of four mineral fiber plate segments in the compressed and compacted state whereas the diverging and upwardly sloping second sections serves the purpose of allowing the compacted and compressed mineral fiber plate segments to expand to a small degree for producing a complete stretching of the material of the package wihtin which the mineral fiber plate segments are contained.

In FIG. 20, a package 389 produced in the packaging plant described above with reference to FIG. 19 is shown. The package 389 provides a complete and hermetic encasing of the mineral fiber plate segments contained within the sealing packaging foils. Like the above described package 289, the mineral fiber plate segments are compacted to 60–80% of the initial volume, or even less, such as 40–50% of the initial volume, providing a package which occupies far less space as compared to noncompacted mineral fiber plate segments.

The mineral fiber plate segments produced in accordance with the teachings of the present invention may recover to approximately 100% of the original or initial volume after the mineral fiber plate segments have been compacted to the above percentage for an extended period of time. In FIG. 20, the flaps produced from the upper and lower packaging foils 392 and 388, respectively, described above with reference to FIG. 19, are also illustrated. Thus, the reference numeral 420 refers to the upper packaging foil part produced as the outer longitudinal packaging foil segments are sealed together by means of the sealing assembly 404 as described above with reference to FIG. 19. The reference numerals 422 and 424 designate the flaps produced at the front edge of the package as the clamps 412 and 414 are moved towards one another for producing the rearmost sealing of the preceding package corresponding to the flaps 422' and 424' shown in FIG. 20 and for separating the preceding package from the upper and lower packaging foils 492 and 488, respectively. The reference numeral 426 designates the front seal established by means of the heated clamps 412 and 414. Similar seals are, as will be evident from the above description, established circumferentially encircling the mineral fiber plate segments contained within the package 389.

In FIGS. 21, 22, 23, and 24, a particular aspect of the present invention is illustrated, viz. an aspect relating to a particular technique of producing tubular insulating elements. In FIG. 21, an assembly 430 is shown which is composed of three mineral fiber plate segments 150", 150'", and 150$^{IV}$ produced in accordance with the teachings of the present invention as described above with reference to FIGS. 1–5. The mineral fiber plate segments 150", 150'", and 150$^{IV}$ are glued together, producing an integral assembly. By means of a cutting string or a saw blade 432, tubular insulating elements are cut from the assembly 430, producing tubular insulating elements of different configurations. The reference numeral 434 designates a large diameter tubular insulating element which is produced from all three mineral fiber plate segments 150", 150'", and 150$^{IV}$. The reference numeral 436 designates a single smaller diameter tubular insulating element which is produced from a single mineral fiber plate segment, viz. the mineral fiber plate segment 150$^{IV}$. Three additional, identical tubular insulating elements are also shown in FIG. 21.

The reference numeral 438 designates a tubular insulating element of a configuration somewhat different from the configuration of the larger diameter tubular insulating element 434 and the smaller diameter tubular insulating element 436. Whereas the tubular insulating elements 434 and 436 constitute tubular insulating elements having circular cylindrical outer and inner walls of concentric configuration, the tubular insulating element 438 constitutes an insulating element having a circular cylindric outer wall and an inner wall providing a flexible inner side which is adaptable to varying applications. The tubular insulating elements 434, 436, and 438 exhibit a highly advantageous capability, as the tubular insulating elements are flexible, allowing the tubular insulating elements to be bent for adapting the tubular insulating element to a specific configuration. In FIG. 22, the tubular insulating element 434 is shown in a bent configuration, allowing the tubular insulating element to be used in connection with a curved pipe or the like. The outer surface of the tubular insulating element 434 is covered by a coating 440 which may constitute a thin plastic foil or a reinforcing aluminum foil. Examples of foils are plastics foils, e.g. woven or non-woven polypropylene foils, such as spun-bound foils, aluminum-reinforced plastics foils or paper, crepe paper or combinations thereof. Fiber-reinforced materials may also be applied, e.g. glass fiber-reinforced plastic material or combinations thereof. The coating 440 may be adhered to the outer surface of the tubular insulating element 434 in numerous ways through a complete surface adhesion or adhesion in individual spots or along specific lines of adhesion extending circumferentially relative to the tubular insulating element, parallel to the longitudinal axis of the tubular insulating element or in a different orientation relative to the circumferential and longitudinal directions of the circular cylindrical insulating element 434. It is to be realized that the elastic capability of the mineral fiber plate segments 150", 150'", and 150iv shown in FIG. 21 may be utilized in different ways by producing the tubular insulating elements in a different orientation relative to the orientation of the mineral fiber plate segment 150'", etc., providing an insulating element such as a tubular insulating element exhibiting a characteristic capability of allowing the insulating element to be compacted in a specific direction determined by the direction determined by the mineral fiber plate segments 150", etc. along which direction the mineral fiber plate segments are compactable.

In FIG. 23, the above characteristic property is illustrated as a total of four mineral fiber plate segments 444', 444", 444'", and 444$^{IV}$ are positioned in mutually parallel relationship defining an assembly 442. By means of the above described cutting wire or saw blade 432, tubular insulating elements 434' and 438' of configurations similar to the above described tubular insulating elements 434 and 438, respectively, are produced. Contrary to the tubular insulating elements described above with reference to FIG. 21, the tubular insulating elements 434' and 438' shown in FIG. 23 extend perpendicularly to the outer surfaces of the individual mineral fiber plate segments 444', etc. Dependent on the characteristic properties of the mineral fiber plate segments 444', 444", and 444"", and 444$^{IV}$, the tubular insulating elements 434' and 438' produced therefrom exhibit characteristics as to compactness or flexibility. In FIG. 24, the tubular insulating element 434' is shown provided with an outer coating 440'. The coating 440' may be produced from any of the materials discussed above with reference to FIG. 22.

Table 1 below illustrates measuring results relating to thermal insulating properties and compression properties of mineral fiber plates according to the present invention and produced with varying height compression ratio, and a conventional board or plate. The density of all boards or plates were 80 kg/mr$^3$. The signature λ refers to the coefficient of heat transmission as expressed in mW/mK, the signature δ refers to the compressive strength as expressed in kPa, and the signature E refers to the elasticity of compression as expressed in kPa. The indices e, t and l indicates the direction of measurement of the property in question relating to the above defined directions e: elevational direction, t: transversal direction and l: longitudinal direction.

TABLE 1

| | Plates according to the present invention Height compression ratio | | | | Conventional |
|---|---|---|---|---|---|
| | 1:1 | 1.2:1 | 1.37:1 | 2.3:1 | board or plate |
| λe | 36.3 | 35.5 | 35.0 | 33.0 | 32.5 |
| δe | 24 | 20 | 17 | 11 | 8 |
| Ee | 350 | 350 | 280 | 110 | 110 |
| λt | 39.5 | 39.0 | 40.0 | 39.3 | 38.0 |
| δt | .46 | 46 | 46 | 46 | 60 |

TABLE 1-continued

| | Plates according to the present invention Height compression ratio | | | | Conventional |
|---|---|---|---|---|---|
| | 1:1 | 1.2:1 | 1.37:1 | 2.3:1 | board or plate |
| Et | 2400 | 2400 | 1750 | 1250 | 3400 |
| λl | 33.0 | 34.5 | 35.0 | 36.0 | |
| δl | 8.5 | 15.5 | 15.5 | 19.0 | |
| El | 120 | 220 | 250 | 330 | |

From Table 1, the following conclusions may be made:

The values of $\lambda_e$ of the plates according to the present invention are of the order of 35–36 mW/mK and consequently better than the value of $\lambda_t$ of conventional boards or plates being of the order of 38 mW/mK, however, somewhat larger than the $\lambda_e$ of the conventional boards or plates being of the order of 32.5 mW/mK.

The application of height compression during the process of producing the mineral fiber plates according to the present invention renders it possible to improve the value of $\lambda_e$ by reducing the value from 35–36 mW/mK as indicated in Table 1 above to approximately 33 mW/mK.

The compressive strength $\delta_e$ of the plates according to the present invention is of the order of 17–24 kPa and consequently far better than the value of $\delta_e$ of the conventional board or plate being of the order of 8 kPa. As is evident from Table 1, the value of $\delta_e$ of the plates according to the present invention is dependent on the application of height compression and in particular the height compression ratio. The value of $E_e$ of the plates according to the present invention is of the order of 280–350 kPa provided a fairly low height compression ratio is applied. Consequently, the elasticity of compression of the mineral fiber plates according to the present invention is consequently substantially better than the elasticity of compression of the conventional board or plate along the elevational direction of the boards or plates, i.e. perpendicular to the longitudinal and transversal directions of the boards or plates.

The product produced as described above with reference to FIG. 7 constitutes a so-called wired insulating mat for insulating e.g. boilers, vessels, pipes, tubings, tubes or the like. It is comtemplated that the application of height compression during the process of producing the product reduces the difference in thermal insulating property between any two products. It is, however, to be realized that the application of height compression above a certain limit may overall improve the thermal insulating property of the final product as the improved compression properties may reduce the number of supports of an external facing so that the number of thermal bridges are completely or to a certain extent eliminated.

Experiments have revealed that the so-called wired mat is far more easy to handle and mount as compared to similar conventional products.

Below, four tables illustrates measuring results of comparable products and products according to the present invention. Table 2 illustrates results of a mineral fiber plate according to the present invention and of the type shown in FIG. 10 (identified by T) as compared to conventional boards or plates constituted by a board produced by the company Scan Glasuld A/S (identified by U), and boards produced by the applicant's Danish division and German division (identified by V and W, respectively). All boards or plates had a thickness of 30 mm.

TABLE 2

| Name | Density kg/m³ | Deformation at 3 kN/M² | Bending Resistance (g) | Contraction (mm) | λ (mW/mK) |
|---|---|---|---|---|---|
| T | 42 | 2,7 | 1100 | 3,3 | 41 |
| U | 25 | 4,6 | 1200 | 1,9 | 43 |
| V | 37 | 2,8 | 1400 | 2,9 | 43 |
| W | 42 | 5,0 | 1000 | 5,5 | 41 |

Table 3 similarly illustrates the properties of Table 2 converted into a score ranging from 1 to 10.

TABLE 3

| Name | Density | Deformation at 3 kN/M² | Bending Resistance | Contraction | λ |
|---|---|---|---|---|---|
| T | 8 | 10 | 8 | 10 | 9 |
| U | 10 | 5 | 9 | 9 | 7 |
| V | 9 | 8 | 8 | 7 | 7 |
| W | 8 | 5 | 10 | 4 | 9 |

Table 4 illustrates the properties of the flexible mineral fiber plate shown in FIG. 15 according to the present invention (identified by X) as compared to conventional so-called FLEXI A-BATTS™ plates or boards manufactured by the applicant (identified by Y) and products produced by the competitor, the Danish company Scan Glasuld A/S (identified by Z). The table clearly illustrates the advantageous combination of high thermal insulating capability, high flexibility and high compression stiffness.

TABLE 4

| PRODUCT | λ value mW/mK | Flexibility (0–10) | Density (kg/m³) | Compression stiffness (0–10) |
|---|---|---|---|---|
| X | 37 | 8 | 32 | 10 |
| Y | 36 | 4 | 32 | 4 |
| Z | 36 | 3 | 17 | 2 |

Table 5 illustrates the properties of the above described wired mat produced as above with reference to FIG. 7 (identified by XX) and a similar conventional wired product manufactured by the applicant (identified by YY). Score ranging from 1 to 10.

TABLE 5

| PRODUCT | λ (0–10) | Installation (0–10) | Thickness tolerances (0–10) |
|---|---|---|---|
| XX | 7 | 7 | 10 |
| YY | 10 | 3 | 4 |

Experiments have revealed that the flexible property of the mineral fiber plates according to the present invention as illustrated in FIG. 15 renders it possible to provide more reliable and perfect insulation as compared to the application of comparable conventional products which are flexible.

Tests were made for comparing a so-called FLEXI A-BATTS™ manufactured by the applicant and a mineral fiber plate product as shown in FIG. 15. Both products were mounted in an aperture of a width of 880 mm. Both products had a width exceeding the width of the aperture by 40 mm. Results:

Conventional boards or plates of the type FLEXI A-BATTS™ of a thickness of 100 mm and a density of 32 kg/m³ were mounted without the application of physical impact. During the compression of the flexible part of the boards or plates, the boards or plates were folded at the center of the boards or plates. After the mounting, only minor insulating faults were observed. Overall homogeneous surfaces were produced.

Mineral fiber plates according to the present invention of a thickness of 100 mm and a density of 39 kg/m³ were easily mounted producing a perfect filling out. The plates were folded during the process of producing the plates to a width of 120 mm and were compressed within the curing furnace to an overall width of 100 mm.

Due to the folded structure of the mineral fiber plate according to the present invention, the plate is very easily compressible still providing a density of the order of approximately 40 kg/mr³. It is contemplated that the application of height compression during the process of producing the mineral fiber plate according to the present invention may improve the integrity of the final product. However, it has been proved that height compression may to some extent reduce the flexibility of the product.

As compared to conventional boards or plates, the mineral fiber plate according to the present invention provides an increased compressive strength and increased elasticity of compression of the order of 2–2.5 times. Consequently, the mineral fiber plate according to the present invention may be exposed to larger pressure impact as compared to the conventional boards or plates without producing insulation faults. As verified above the improved flexibility is believed to provide a more adequate integration or junction to the existing structure which is to be insulated.

On the basis of the measurements discussed above, it has been proved that the mineral fiber plate according to the present invention may provide a flexibility of the order of 60 mm at a load of 2 kPa in the longitudinal direction. Provided the flexibility is transformed into modulus of elasticity, a modulus of elasticity of no more than 20 kPa is provided at a width of 600 mm of the plate and similarly a modulus of elasticity of no more than 30 kPa at a length of 900 mm. A conventional mineral fiber board or plate of a density of 35 kg/m³ exhibits a modulus of elasticity of the order of 130–225 kPa, however, to some extent depending on the predominant orientation of the mineral fibers of the board or plate. It is to be realized that the optimum flexible mineral fiber plate exhibits a modulus of elasticity varying between 20 and 30 kPa, provided the length of the plate is between 600 and 900 mm, respectively. The mineral fiber plate according to the present invention and of the type disclosed in FIG. 13 exhibits a modulus of elasticity of approximately 20 kPa, provided the mineral fiber plate has been exposed to height compression such as a ration of 1:1 during the process of producing the mineral fiber plate and similarly a modulus of elasticity of approximately 30 kPa provided the mineral fiber plate has been exposed to height compression during the process of producing the mineral fiber plate of such as a ratio of 1.33:1. In the transversal direction, the mineral fiber plate according to the present invention exhibits a modules of elasticity which is comparable with the modulus of elasticity of the conventional mineral fiber board or plate such as a modulus of elasticity of approximately 200 kPa.

We claim:

1. A method of producing a cured non-woven mineral fiber web comprising the following steps:
    a) producing a first non-woven mineral fiber web defining a first longitudinal direction parallel with said first mineral fiber web and a first transversal direction parallel with said first mineral fiber web, said first mineral fiber web containing mineral fibers arranged in said first longitudinal direction thereof and including a first curable bonding agent, b) moving said first mineral fiber web in said first longitudinal direction, c) arranging segments of said first mineral fiber web in partly mutually overlapping relationship and transversely relative to said first longitudinal direction and said first transversal direction so as to produce a second non-woven mineral fiber web, said second mineral fiber web defining a second longitudinal direction and a second transversal direction and containing mineral fibers arranged transversely relative to said second longitudinal direction and said second transversal direction and generally transversely relative to one another, d) moving said second mineral fiber web in said second longitudinal direction, e) folding said second mineral fiber web transversely relative to said second longitudinal direction and parallel with said second transversal direction so as to produce undulations extending perpendicular to said second longitudinal direction and parallel with said second transversal direction and to produce a third non-woven mineral fiber web, said third mineral fiber web containing mineral fibers arranged transversely relative to one another and transversely relative to said second longitudinal direction and said second transversal direction, f) moving said third non-woven mineral fiber web in said second longitudinal direction, and g) curing said first curable bonding agent so as to cause said mineral fibers of said third mineral fiber web to bond to one another, thereby forming said cured non-woven mineral fiber web.

2. The method according to claim 1, said arranging of said segments of said first mineral fiber web in partly mutually overlapping relationship of step c) comprising the initial step of cutting said first mineral fiber web into said segments.

3. The method according to claim 1, said arranging of said segments of said first mineral fiber web in partly mutually overlapping relationship of step c) comprising folding said segments of said first mineral fiber web transversely relative to said first longitudinal direction and said first transversal direction.

4. The method according to claim 1, said arranging of said segments of said first mineral fiber web in partly mutually overlapping relationship of step c) being performed so as to position said segments of said first mineral fiber web along a direction defining an angle larger than 0° and smaller than 90° relative to said second transversal direction.

5. The method according to claim 1, said folding of said second mineral fiber web of step e) being performed as a transverse folding relative to said second longitudinal direction.

6. The method according to claim 1, said first mineral fiber web being a mineral fiber web of having an area weight between 0.1 kg/m$^2$ and 1.0 kg/m$^2$.

7. The method according to claim 1, said second mineral fiber web being a mineral fiber web of an area weight between 0.3 kg/m$^2$ and 3.0 kg/m$^2$.

8. The method according to claim 1, further comprising the additional step of height compressing said second mineral fiber web produced in step c).

9. The method according to claim 1, further comprising the additional step of longitudinally compressing said second mineral fiber web produced in step c).

10. The method according to claim 1, further comprising the additional step of transversally compressing said second mineral fiber web produced in step c).

11. The method according to claim 1, further comprising the additional step of height compressing said third mineral fiber web produced in step e).

12. The method according to claim 1, further comprising the additional step of longitudinally compressing said third mineral fiber web produced in step e).

13. The method according to claim 1, further comprising the additional step of transversally compressing said third mineral fiber web produced in step e).

14. The method according to claim 1, further comprising the following steps substituting step g):

h) producing a fourth non-woven mineral fiber web defining a third longitudinal direction parallel with said fourth mineral fiber web, said fourth mineral fiber web containing mineral fibers and including a second curable bonding agent, said fourth mineral fiber web being a mineral fiber web of a higher compactness as compared to said third mineral fiber web, i) adjoining said fourth mineral fiber web to said third mineral fiber web in facial contact therewith for producing a fifth composite mineral fiber web, and j) curing said first and second curable bonding agents so as to cause said mineral fibers of said fifth composite mineral fiber web to bond to one another, thereby forming said cured non-woven mineral fiber web.

15. The method according to claim 14, said fourth mineral fiber web being produced by separating a separate layer of said first mineral fiber web therefrom and by compacting said separate layer for producing said fourth mineral fiber web.

16. The method according to claim 14, said fourth mineral fiber web being produced by separating a separate layer of said second mineral fiber web therefrom and by compacting said separate layer for producing said fourth mineral fiber web.

17. The method according to claim 14, said fourth mineral fiber web being produced by separating a separate layer of said third mineral fiber web therefrom and by compacting said separate layer for producing said fourth mineral fiber web.

18. The method according to claim 15, said compacting of said separate layer comprising the step of folding said separate layer so as to produce said fourth mineral fiber web containing mineral fibers arranged transversely relative to said third longitudinal direction of said fourth mineral fiber web.

19. The method according to claim 14, comprising the additional step similar to the step h) of producing a sixth non-woven mineral fiber web similar to said fourth mineral fiber web, and the step of adjoining in step i) said sixth mineral fiber web to said third mineral fiber web in facial contact therewith so as to sandwich said third mineral fiber web between said fourth and sixth mineral fiber webs in said fifth composite mineral fiber web.

20. The method according to claim 14, said third longitudinal direction being perpendicular to said second longitudinal direction.

21. The method according to claim 14, said third longitudinal direction being identical to said second longitudinal direction.

22. The method according to claim 14, comprising the additional step of compressing said fifth composite mineral fiber web prior to curing said fifth composite mineral fiber web in step j).

23. The method according to claim 1, further comprising the following steps prior to step e):

k) producing a seventh non-woven mineral fiber web defining a fourth longitudinal direction parallel with said seventh mineral fiber web, said seventh mineral fiber web containing mineral fibers and including a third curable bonding agent, said seventh mineral fiber web being a mineral fiber web of a higher compactness as compared to said second mineral fiber web, and l) adjoining said seventh mineral fiber web to said second mineral fiber web produced in step c) in facial contact therewith, prior to step e), for producing an eighth composite mineral fiber web to be folded in step e) for producing said third non-woven mineral fiber web, and step g) also including curing said third curable bonding agent.

24. The method according to claim 23, said seventh mineral fiber web being produced by separating a separate layer of said first mineral fiber web therefrom and by compacting said separate layer for producing said seventh mineral fiber web.

25. The method according to claim 23, said seventh mineral fiber web being produced by separating a separate layer of said second mineral fiber web therefrom and by compacting said separate layer for producing said seventh mineral fiber web.

26. The method according to claim 24, said compacting of said separate layer comprising the step of folding said separate layer so as to produce said seventh mineral fiber web containing mineral fibers arranged transversely relative to said fourth longitudinal direction of said seventh mineral fiber web.

27. The method according to claim 1, further comprising the step of applying a covering to a side surface or both side surfaces of said third mineral fiber web.

28. The method according to claim 1, further comprising the step of applying a covering to a side surface or both side surfaces of said fifth composite mineral fiber web.

29. The method according to claim 1, said curing being performed by means of a curing oven.

30. The method according to claim 1, further comprising the step of cutting said cured non-woven mineral fiber web into plate segments.

31. A method according to claim 1, further comprising:

providing a package, arranging said cured non-woven mineral fiber web within said package, compacting said cured non-woven mineral fiber web for substantially reducing the overall volume of said mineral fiber web to 30–95% of the overall volume of said non-compacted mineral fiber web, and sealing said package for providing a sealed package within which said mineral fiber web is kept in a compacted state in which the overall volume of said mineral fiber plate constitutes 30–100% of the overall volume of said non-compacted mineral fiber plate.

32. The method according claim 31, further comprising packaging a plurality of mineral fiber webs, each defining a respective first direction, and said said mineral fiber webs within said package including arranging said plurality of mineral fiber webs within said package so as to arrange said mineral fiber webs of said plurality in a mutually parallel relationship and having said respective first directions of said mineral fiber webs positioned parallel to one another.

33. The method according to claim 31, said package being constituted by a sealable thermoplastic foil to be wrapped around and sealed around said compacted mineral fiber web after said compacting of said mineral fiber web.

34. The method according to claim 4, where in the arranging step is performed so as to position said segments of said first mineral fiber web along a direction defining an angle larger than about 10° and smaller than about 60° relative to said second transversal direction.

35. The method according to claim 4, where in the arranging step is performed so as to position said segments of said first mineral fiber web along a direction defining an angle larger than about 20° and smaller than about 50° relative to said second transversal direction.

36. The method according to claim 6, wherein the area weight of the first mineral fiber web is between 0.2 kg/m$^2$ and 0.6 kg/m$^2$.

37. The method according to claim 7, wherein the second mineral fiber web comprises an area weight between 0.5 kg/m$^2$ and 2.0 kg/m$^2$.

38. The method according to claim 31, wherein compacting reduces the overall volume of the mineral fiber plate to 30–85% of the overall volume of the non-compacted mineral fiber plate.

39. The method according to claim 31, wherein compacting reduces the overall volume of the mineral fiber plate to 40–60% of the overall volume of the non-compacted mineral fiber plate.

40. The method according to claim 31, wherein the mineral fiber plate is kept in a compacted state in which the overall volume of the mineral fiber plate constitutes 50–90% of the overall volume of the non-compacted mineral fiber plate.

41. The method according to claim 31, wherein the mineral fiber plate is kept in a compacted state in which the overall volume of the mineral fiber plate constitutes 60–80% of the overall volume of the non-compacted mineral fiber plate.

42. The method according to claim 33, wherein the sealable thermoplastic foil is a heat sealable thermoplastic foil.

43. A plant for producing a cured non-woven mineral fiber web comprising:

a) first means for producing a first non-woven mineral fiber web defining a first longitudinal direction parallel with said first mineral fiber web and a first transversal direction parallel with said first mineral fiber web, said first mineral fiber web containing mineral fibers predominantly arranged generally in said first longitudinal direction thereof and including a first curable bonding agent, b) second means for moving said first mineral fiber web in said first longitudinal direction, c) third means for arranging segments of said first mineral fiber web in partly mutually overlapping relationship transversely relative to said first longitudinal direction and said first transversal direction so as to produce a second non-woven mineral fiber web, said second mineral fiber web defining a second longitudinal direction and a second transversal direction and containing mineral fibers predominantly arranged generally transversely relative to said second longitudinal direction and said second transversal direction and generally transversely relative to one another, d) fourth means for moving said second mineral fiber web in said second longitudinal direction, e) fifth means for folding said second mineral fiber web transversely relative to said second longitudinal direction and parallel with said second transversal direction to produce undulations extending perpendicular to said second longitudinal direction and parallel with said second transversal direction, and to produce a third non-woven mineral fiber web, said third mineral fiber web containing mineral fibers predominantly arranged generally transversely relative to one another and generally transversely relative to said second longitudinal direction and said second transversal direction, f) sixth means for moving said third non-woven mineral fiber web in said second longitudinal direction, and g) seventh means for curing said first curable bonding agent so as to cause said mineral fibers of said third mineral fiber web to bond to one another, thereby forming said cured non-woven mineral fiber web.

44. The plant according to claim 43, said third means for arranging said segments of said first mineral fiber web in partly mutually overlapping relationship being adapted to perform the initial step of cutting said first mineral fiber web into said segments.

45. The plant according to claim 43, said third means for arranging said segments of said first mineral fiber web in partly mutually overlapping relationship being adapted to fold said segments of said first mineral fiber web transversely relative to said first longitudinal direction and said first transversal direction.

46. The plant according to claim 43, said third means for arranging said segments of said first mineral fiber web in partly mutually overlapping relationship being adapted to perform said arranging so as to position said segments of said first mineral fiber web in partly mutually overlapping relationship along a direction defining an angle larger than 0° and smaller than 90° relative to said first longitudinal direction.

47. The plant according to claim 43, said fifth means for folding said second mineral fiber web being adapted to perform said folding as a transverse folding relative to said second longitudinal direction.

48. The plant according to claim 43, said first mineral fiber web being a mineral fiber web having an area weight between 0.1 kg/m² and 1.0 kg/m².

49. The plant according to claim 43, said second mineral fiber web being a mineral fiber web having an area weight between 0.3 kg/m² and 3.0 kg/m².

50. The plant according to claim 43, further comprising eighth means for height compressing said second mineral fiber web produced by said third means.

51. The plant according to claim 43, further comprising ninth means for longitudinally compressing said second mineral fiber web produced by said third means.

52. The plant according to claim 43, further comprising tenth means for transversally compressing said second mineral fiber web produced by said third mean.

53. The plant according to claim 43, further comprising eleventh means for height compressing said third mineral fiber web produced by said fifth means.

54. The plant according to claim 43, further comprising twelfth means for longitudinally compressing said third mineral fiber web produced by said fifth means.

55. The plant according to claim 43, further comprising thirteenth means for transversally compressing said third mineral fiber web produced by said fifth means.

56. The plant according to claim 43, further comprising the additional means for substituting said seventh means and comprising:

g) fourteenth means for producing a fourth non-woven mineral fiber web defining a third longitudinal direction parallel with said fourth mineral fiber web, said fourth mineral fiber web containing mineral fibers and including a second curable bonding agent, said fourth mineral fiber web being a mineral fiber web of a higher compactness as compared to said third mineral fiber web, i) fifteenth means for adjoining said fourth mineral fiber web to said third mineral fiber web in facial contact therewith for producing a fifth composite mineral fiber web, and j) said seventh means being adapted to cure said first and second curable bonding agents so as to cause said mineral fibers of said fifth composite mineral fiber web to bond to one another, thereby forming said cured non-woven mineral fiber web.

57. The plant according to claim 56, said fourth mineral fiber web being produced by means of sixteenth means for separating a separate layer of said first mineral fiber web therefrom and by compacting said separate layer for producing said fourth mineral fiber web.

58. The plant according to claim 56, said fourth mineral fiber web being produced by means of seventeenth means for separating a separate layer of said second mineral fiber web therefrom and by compacting said separate layer for producing said fourth mineral fiber web.

59. The plant according to claim 56, said fourth mineral fiber web being produced by means of eighteenth means for separating a separate layer of said third mineral fiber web therefrom and by compacting said separate layer for producing said fourth mineral fiber web.

60. The plant according to claim 57, said compacting of said separate layer being performed by means of nineteenth means for folding said separate layer so as to produce said fourth mineral fiber web containing mineral fibers arranged transversely relative to said third longitudinal direction of said fourth mineral fiber web.

61. The plant according to claim 56, further comprising twentieth means similar to said fourteenth means for producing a sixth non-woven mineral fiber web similar to said fourth mineral fiber web, and twenty-first means similar to said fifteenth means for adjoining said sixth mineral fiber web to said third mineral fiber web in facial contact therewith so as to sandwich said third mineral fiber web between said fourth and sixth mineral fiber webs in said fifth composite mineral fiber web.

62. The plant according to claim 56, said third longitudinal direction being perpendicular to said second longitudinal direction.

63. The plant according to claim 56, said third longitudinal direction being identical to said second longitudinal direction.

64. The plant according to claim 56, further comprising twenty-second means for compressing said fifth composite mineral fiber web prior to curing said fifth composite mineral fiber web by means of said sixth means.

65. The plant according to claim 43, further comprising the following means in advance of said fifth means:

k) twenty-third means for producing a seventh non-woven mineral fiber web defining a fourth longitudinal direction parallel with said seventh mineral fiber web, said seventh mineral fiber web containing mineral fibers and including a third curable bonding agent, said seventh mineral fiber web being a mineral fiber web of a higher compactness as compared to said second mineral fiber web, and l) twenty-fourth means for adjoining said seventh mineral fiber web to said second mineral fiber web produced by said third means in facial contact therewith, prior to folding said second mineral fiber web by means of said fifth means, for producing an eighth composite mineral fiber web to be folded by means of said fifth means for producing said third non-woven mineral fiber web, and said seventh means also being adapted to cure said third curable bonding agent.

66. The plant according to claim 65, said seventh mineral fiber web being produced by separating a separate layer of said first mineral fiber web therefrom and by compacting said separate layer for producing said seventh mineral fiber web.

67. The plant according to claim 65, said seventh mineral fiber web being produced by separating a separate layer of said second mineral fiber web therefrom and by compacting said separate layer for producing said seventh mineral fiber web.

68. The plant according to claim 66, said compacting of said separate layer being performed by means of twenty-fifth means for folding said separate layer so as to produce said seventh mineral fiber web containing mineral fibers arranged transversely relative to said fourth longitudinal direction of said seventh mineral fiber web.

69. The plant according to claim 43, further comprising twenty-sixth means for applying a covering to a side surface or both side surfaces of said third mineral fiber web.

70. The plant according to claim 56, further comprising twenty-seventh means for applying a covering to a side surface or both side surfaces of said fifth composite mineral fiber web.

71. The plant according to claim 43, further comprising twenty-eighth means for cutting said cured third mineral fiber web into plate segments.

72. The plant according to claim 56, further comprising twenty-ninth means for cutting said cured fifth composite mineral fiber web into plate segments.

73. The plant according to claim 43, said seventh means being constituted by a curing oven.

74. The plant according to claim 46, wherein the angle between the first mineral fiber web relative to the first longitudinal direction is larger than about 10° and smaller than about 60°.

75. The plant according to claim 46, wherein the angle between the first mineral fiber web relative to the first longitudinal direction is larger than about 20° and smaller than about 50°.

76. The plant according to claim 43, wherein the first mineral fiber web comprises an area weight between 0.2 kg/m$^2$ and 0.6 kg/m$^2$.

77. The plant according to claim 49, wherein the second mineral fiber web comprises an area weight between 0.5 kg/m$^2$ and 2.0 kg/m$^2$.

78. A mineral fiber plate defining a first direction and comprising:
first and second lamellae arranged transversely relative to said first direction, said first and second lamellae containing mineral fibers arranged transversely relative to said first direction and transversely relative to one another,
a surface layer applied to one side of said first and second lamellae or opposite surface layers of identical structure, sandwiching said first and second lamellae in said integral structure, and
said fibers of said first and second lamellae being bonded together in an integral structure solely through hardened bonding agents hardened in a single hardening process and initially present in uncured, non-woven mineral fiber webs from which said first and second lamellae are produced.

79. The mineral fiber plate according to claim 78, said first and second lamellae being bonded together through hardened bonding agents in a single hardening process and initially present in uncured, non-woven mineral fiber webs from which said first and second lamellae are produced.

80. The mineral fiber plate according to claim 78, said first and second lamellae being interconnected through mineral fiber layers of a higher mineral fiber compactness as compared to said lamellae.

81. A mineral fiber plate according to claim 78, wherein:
said mineral fiber plate is contained in a sealed package, and
said mineral fiber plate is kept in a compacted state within said sealed package in which state the overall volume of said mineral fiber plate is reduced 30–100% of the overall volume of said non-compacted mineral fiber plate through compacting said mineral fiber plate.

82. The mineral fiber plate according to claim 81, said package including a plurality of mineral fiber plates.

83. The mineral fiber plate according to claim 81, wherein the overall volume of the mineral fiber plate within the sealed package is reduced 50–90% of the overall volume of the non-compacted mineral fiber plate.

84. The mineral fiber plate according to claim 81, wherein the overall volume of the mineral fiber plate within the sealed package is reduced 60–80% of the overall volume of the non-compacted mineral fiber plate.

85. A tubular insulating element comprising a body containing mineral fibers bonded together in an integral structure through hardened bonding agents and being produced from a mineral fiber plate produced according to claim 78 and defining a first longitudinal direction parallel with said non-woven mineral fiber web, a first transverse direction parallel with said non-woven mineral fiber web, and a second transversal direction perpendicular to said first longitudinal and transversal directions by cutting said tubular insulating element from said non-woven mineral fiber web defining a second longitudinal direction, said second longitudinal direction being parallel with said first longitudinal direction, said first transversal direction, or said second transversal direction or defining a specific angular relationship with said first longitudinal direction, said first transversal direction or said second transversal direction.

86. The tubular insulating element according to claim 85, said mineral fibers being bonded together in said integral structure solely through said hardened bonding agents hardened in a single hardening process and initially present in uncured non-woven mineral fiber webs from which said mineral fiber plate is produced.

87. The tubular insulating element according to claim 85, said mineral fiber plate constituting a mineral fiber plate assembly composed of a plurality of individual mineral fiber plate segments.

88. The tubular insulating element according to claim 85, said mineral fiber plate or said mineral fiber plate segments being produced from an uncured non-woven mineral fiber web and being exposed to:
compression along said first longitudinal direction; compression along said first transversal direction; compression along said second transversal direction; or a combination thereof;
said compression occurring prior to, after, or prior to and after curing said uncured non-woven mineral fiber web.

89. The tubular insulating element according to any of the claim 85, further comprising an outer surface coating applied to said tubular insulating element, said outer surface coating being constituted by a plastics foil, a woven or non-woven plastics fiber foil, an aluminum foil, an aluminum foil reinforced plastics foil, a fiber reinforced plastics foil, a crape paper covering, a glass fiber reinforced foil or a combination thereof.

90. A method of producing a tubular insulating element, comprising the following steps:
   a) providing a non-woven mineral fiber web produced according to the method of claim 1 and defining a first longitudinal direction parallel with said non-woven mineral fiber web, a first transversal direction parallel with said non-woven mineral fiber web, and a second transversal direction perpendicular to said first longitudinal and transversal directions, and
   b) cutting said tubular insulating element from said non-woven mineral fiber web defining a second longitudinal direction, said second longitudinal direction being parallel with said first longitudinal direction, said first transversal direction, or said second transversal direction or defining a specific angular relationship with said first longitudinal direction, said first transversal direction or said second transversal direction.

91. The method according to claim 90, said non-woven mineral fiber web constituting a non-woven mineral fiber web assembly composed of a plurality of individual non-woven mineral fiber web segments.

92. The method according to claim 90, said nonwoven mineral fiber web being produced from an uncured non-woven mineral fiber web and being exposed to:
   compression along said first longitudinal direction; compression along said first transversal direction; compression along said second transversal direction; or a combination thereof;
   said compression occurring prior to, after, or prior to and after curing said uncured non-woven mineral fiber web.

93. The method according to claim 76, further comprising the step:
   c) applying an outer surface coating to the tubular insulating element, the outer surface coating being constituted by a plastics foil, a woven or non-woven plastics fiber foil, an aluminum foil, an aluminum foil reinforced plastics foil, a fiber reinforced plastics foil, a crepe paper covering, a glassfiber reinforced foil or a combination thereof.

94. A method of producing a cured non-woven mineral fiber web comprising the following steps:
   a) producing a first non-woven mineral fiber web defining a first longitudinal direction parallel with said first mineral fiber web and a first transversal direction parallel with said first mineral fiber web, said first mineral fiber web containing mineral fibers arranged in said first longitudinal direction thereof and including a first curable bonding agent,
   b) moving said first mineral fiber web in said first longitudinal direction,
   c) arranging segments of said first mineral fiber web in partly mutually overlapping relationship and transversely relative to said first longitudinal direction and said first transversal direction so as to produce a second non-woven mineral fiber web, said second mineral fiber web defining a second longitudinal direction and a second transversal direction and containing mineral fibers arranged transversely relative to said second longitudinal direction and said second transversal direction and generally transversely relative to one another, said segments of said first mineral fiber web defining an angle larger than about 10° and smaller than about 60° relative to said second transversal direction,
   d) moving said second mineral fiber web in said second longitudinal direction,
   e) folding said second mineral fiber web transversely relative to said second longitudinal direction and parallel with said second transversal direction so as to produce a third non-woven mineral fiber web, said third mineral fiber web containing mineral fibers arranged transversely relative to one another and transversely relative to said second longitudinal direction and said second transversal direction,
   f) moving said third non-woven mineral fiber web in said second longitudinal direction, and
   g) curing said first curable bonding agent so as to cause said mineral fibers of said third mineral fiber web to bond to one another, thereby forming said cured non-woven mineral fiber web.

95. The method according to claim 94, wherein said segments of said first mineral fiber web define an angle larger than about 20° and smaller than about 50° relative to said second transversal direction.

96. A plant for producing a cured non-woven mineral fiber web comprising:
   a) first means for producing a first non-woven mineral fiber web defining a first longitudinal direction parallel with said first mineral fiber web and a first transversal direction parallel with said first mineral fiber web, said first mineral fiber web containing mineral fibers predominantly arranged generally in said first longitudinal direction thereof and including a first curable bonding agent,
   b) second means for moving said first mineral fiber web in said first longitudinal direction,
   c) third means for arranging segments of said first mineral fiber web in partly mutually overlapping relationship transversely relative to said first longitudinal direction and said first transversal direction so as to produce a second non-woven mineral fiber web, said second mineral fiber web defining a second longitudinal direction and a second transversal direction and containing mineral fibers predominantly arranged generally transversely relative to said second longitudinal direction and said second transversal direction and generally transversely relative to one another, said segments of said first mineral fiber web defining an angle larger than about 10° and smaller than about 60° relative to said second transversal direction,
   d) fourth means for moving said second mineral fiber web in said second longitudinal direction,
   e) fifth means for folding said second mineral fiber web transversely relative to said second longitudinal direction and parallel with said second transversal direction so as to produce a third non-woven mineral fiber web, said third mineral fiber web containing mineral fibers predominantly arranged generally transversely relative to one another and generally transversely relative to said second longitudinal direction and said second transversal direction,
   f) sixth means for moving said third non-woven mineral fiber web in said second longitudinal direction, and
   g) seventh means for curing said first curable bonding agent so as to cause said mineral fibers of said third mineral fiber web to bond to one another, thereby forming said cured non-woven mineral fiber web.

97. The plant according to claim 96, wherein the angle between the first mineral fiber web relative to the second longitudinal direction is larger than about 20° and smaller than about 50°.

* * * * *

UNITED STATES PATENT AND TRADEMARK OFFICE
CERTIFICATE OF CORRECTION

PATENT NO. : 5,981,024
DATED : NOVEMBER 9, 1999
INVENTOR(S) : NOERGAARD ET AL.

It is certified that error appears in the above-identified patent and that said Letters Patent is hereby corrected as shown below:

Col. 4, line 1: "finer" should read --fiber--

Col. 10, line 15: "plant" should read --plate--

Col. 12, line 63: "creape" should read --crepe--

Col. 13, line 31: insert -- : -- after the word "which"

Col. 13, line 53: "i" should read --in--

Col. 15, line 53: "36for" should read --36 for--

Col. 18, line 51: "feber" should read --fiber--

Col. 21, line 20: "i s" should read --is--

Col. 23, line 17: "i" should read --in--

Col. 24, line 25: "convering" should read --covering--

Col. 31, line 12: "150iv" should read --$150^{IV}$--

Col. 31, line 15: "150''' " should read --150"--

Col. 31, line 35: "444'''' " should read --144'''--

Col. 31, line 66, Table 1, col. 2: ".46" should read --46--

UNITED STATES PATENT AND TRADEMARK OFFICE
CERTIFICATE OF CORRECTION

PATENT NO. :   5,981,024
DATED      :   NOVEMBER 9, 1999
INVENTOR(S):   NOERGAARD ET AL.

It is certified that error appears in the above-identified patent and that said Letters Patent is hereby corrected as shown below:

Col. 37, line 58, claim 32:   insert --to-- after the word "according"

Col. 39, line 53, claim 52:   "mean" should read --means--

Col. 42, line 60, claim 89:   delete "any of the" after the word "to"

Signed and Sealed this

Twenty-fourth Day of April, 2001

Attest:

NICHOLAS P. GODICI

Attesting Officer      Acting Director of the United States Patent and Trademark Office